United States Patent
Chatani et al.

(10) Patent No.: US 7,133,217 B2
(45) Date of Patent: Nov. 7, 2006

(54) IMAGE-TAKING OPTICAL SYSTEM AND IMAGE INPUT APPARATUS

(75) Inventors: Sawako Chatani, Tochigi (JP); Toshihiro Sunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/235,520

(22) Filed: Sep. 4, 2002

(65) Prior Publication Data

US 2003/0090794 A1   May 15, 2003

(30) Foreign Application Priority Data

Sep. 4, 2001  (JP)  ............. 2001-267924

(51) Int. Cl.
  *G02B 17/00*  (2006.01)
  *G02B 27/02*  (2006.01)
  *G03B 21/28*  (2006.01)

(52) U.S. Cl. .......... 359/730; 359/727; 359/807; 353/99

(58) Field of Classification Search .......... 353/99; 359/727, 729, 730, 731, 806, 807
See application file for complete search history.

(56) References Cited

U.S. PATENT DOCUMENTS

| | | | | |
|---|---|---|---|---|
| 3,947,103 A | * | 3/1976 | Altman | 353/66 |
| 4,089,599 A | * | 5/1978 | Kuboshima | 353/70 |
| 5,500,516 A | * | 3/1996 | Durbin | 235/472.01 |
| 5,716,118 A | * | 2/1998 | Sato et al. | 353/98 |
| 5,825,560 A | | 10/1998 | Ogura et al. | 359/822 |
| 5,834,749 A | * | 11/1998 | Durbin | 235/454 |
| 5,847,887 A | | 12/1998 | Ogura et al. | 359/822 |
| 5,947,576 A | * | 9/1999 | Sato et al. | 353/70 |
| 5,973,858 A | | 10/1999 | Sekita | 359/729 |
| 5,995,287 A | | 11/1999 | Sekita | 359/599 |
| 5,999,311 A | | 12/1999 | Nanba et al. | 359/365 |
| 6,021,004 A | | 2/2000 | Sekita et al. | 359/676 |
| 6,097,550 A | | 8/2000 | Kimura | 359/729 |
| 6,124,986 A | | 9/2000 | Sekita et al. | 359/691 |
| 6,163,400 A | | 12/2000 | Nanba | 359/365 |
| 6,166,866 A | | 12/2000 | Kimura et al. | 359/729 |
| 6,181,470 B1 | | 1/2001 | Sekita | 359/364 |
| 6,215,596 B1 | | 4/2001 | Araki et al. | 359/631 |
| 6,268,963 B1 | | 7/2001 | Akiyama | 359/631 |
| 6,270,224 B1 | | 8/2001 | Sunaga et al. | 359/857 |
| 6,278,553 B1 | | 8/2001 | Akiyama | 359/627 |
| 6,292,309 B1 | | 9/2001 | Sekita et al. | 359/729 |
| 6,366,411 B1 | | 4/2002 | Kimura et al. | 359/729 |
| 6,626,541 B1 | * | 9/2003 | Sunaga | 353/69 |

FOREIGN PATENT DOCUMENTS

JP   8-292371   11/1996

(Continued)

*Primary Examiner*—David N. Spector
(74) *Attorney, Agent, or Firm*—Morgan & Finnegan, L.L.P.

(57) ABSTRACT

An image-taking optical system according to the present invention for forming an image of a two-dimensional object on an image-taking surface comprises a plurality of reflecting surfaces which reflect light from the two-dimensional object sequentially and guides the light to the image-taking surface, and a reference axis passing through the center of the pupil of the image-taking system and the center of the optical image formed on the image-taking surface is inclined with respect to the normal line of the two-dimensional object.

The present invention provides an image-taking optical system which achieves a reduction in size, ensures a ratio of an amount of peripheral light, allows correction of trapezoidal distortion of a formed image, and is suitable for oblique image-taking.

13 Claims, 20 Drawing Sheets

TWO-DIMENSIONAL OBJECT

FOREIGN PATENT DOCUMENTS

| | | |
|---|---|---|
| JP | 8-292372 | 11/1996 |
| JP | 9-5650 | 1/1997 |
| JP | 9-222561 | 8/1997 |
| JP | 10-341319 | 12/1998 |
| JP | 2000-235226 | 8/2000 |

* cited by examiner

FIG.13
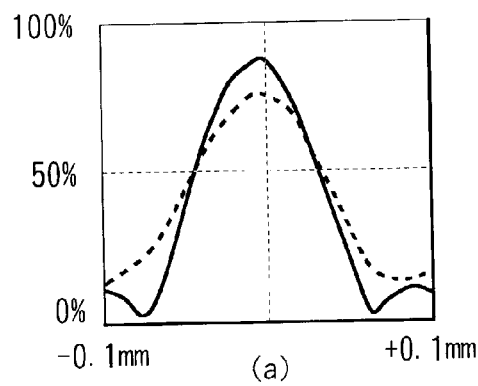
(a)
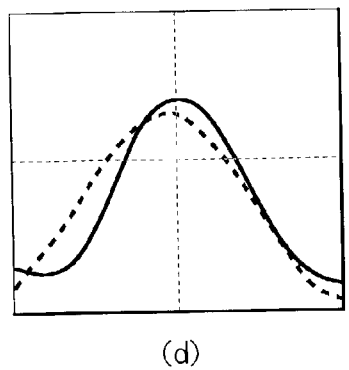
(d)
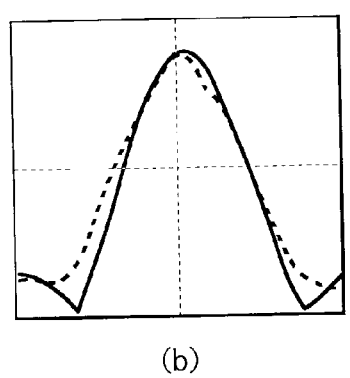
(b)
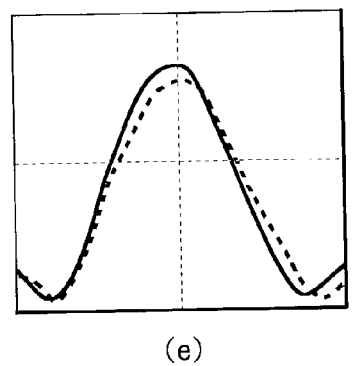
(e)
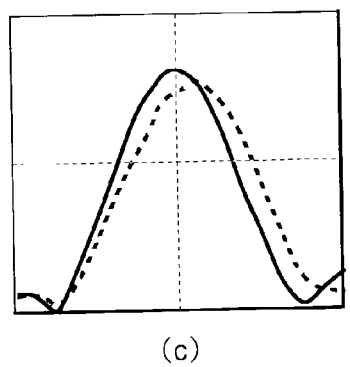
(c)
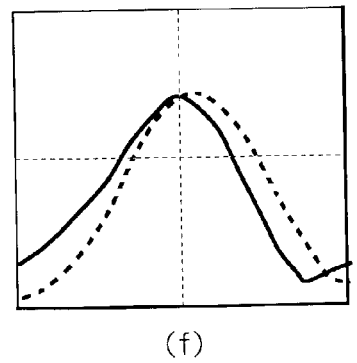
(f)

FIG.20
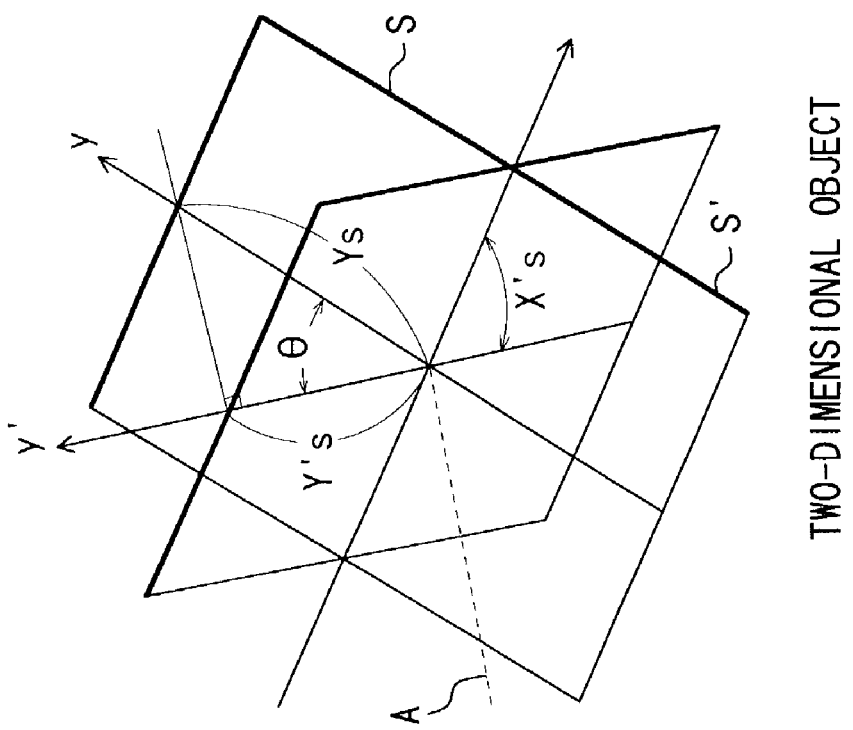
TWO-DIMENSIONAL OBJECT
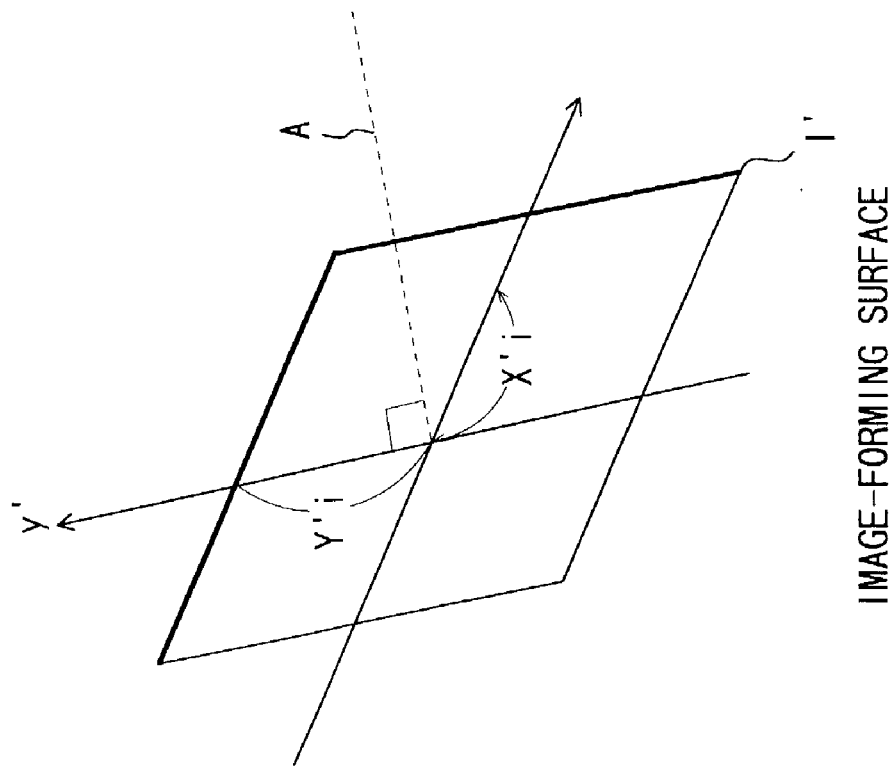
IMAGE-FORMING SURFACE

IMAGE-TAKING OPTICAL SYSTEM AND IMAGE INPUT APPARATUS

BACKGROUND OF THE INVENTION

1. Field of the Invention

The present invention relates to an image-taking optical system which is used in image input apparatuses and the like typified by a document camera and an electronic magnifier to form an image of a two-dimensional object on an image-taking surface.

2. Description of the Related Art

In an image input apparatus having an image-taking optical system for forming an optical image of a two-dimensional object on an image pickup device (photoelectric converting element), the image-taking optical system is disposed at a position in the direction of the normal line of the center of the two-dimensional object as proposed, for example, in Japanese Patent Application Laid-Open No. 2000-235226. Thus, the image input apparatus has a post for fixing the position of the image-taking optical system and a stage for providing the apparatus with a stable center of gravity.

A known example of taking an image of an object obliquely thereto is a shift lens proposed in Japanese Patent Application Laid-Open No. 10-341319. This employs a wide-angle lens with a wide field angle as the image-taking optical system, and an image pickup device is disposed with a position shift from the optical axis of the image-taking optical system to take images by using the periphery of the field angle.

On the other hand, for a noncoaxial optical system, Japanese Patent Application Laid-Open No. 9-5650 discloses a design method thereof and a calculation method of a paraxial quantity such as a focal length, while Japanese Patent Application Laid-Open Nos. 8-292371, 8-292372, and 9-222561 disclose exemplary designs thereof. In the proposals in these applications, the concept of "a reference axis" is introduced and constituent surfaces are formed as asymmetric aspheric surfaces to allow provision of an optical system which has sufficiently corrected aberration.

Such a noncoaxial optical system is called an off-axial optical system. Specifically, it is defined as an optical system which, when a reference axis is defined as being along a light ray passing through the center of an image and the center of the pupil, includes a curved surface (off-axial surface), the normal line of which at the intersection of the reference axis and the constituent surface is not on the reference axis, and in this case the reference axis has a bent shape.

The off-axial optical system generally has noncoaxial constituent surfaces, and no vignetting occurs on a reflecting surface, so that it is easy to form an optical system using the reflecting surface.

Since the image input apparatus proposed in Japanese Patent Application Laid-Open No. 2000-235226 mentioned above has the image-taking optical system disposed at the position in the direction of the normal line in the center of the two-dimensional object, the apparatus requires a post extending from the side of the two-dimensional object for supporting the image-taking optical system and the stage for ensuring the stability of the entire apparatus for the position of the center of the gravity of the post. The entire apparatus thus tends to be increased in size.

FIG. 18 schematically shows a two-dimensional object and an image pickup device which are shifted from the optical axis of an image-taking optical system, which corresponds to the use of the aforementioned shift lens. This image input apparatus requires the use of a large lens system with a wide field angle which covers a field angle θ1 significantly larger than θ2, even though the actually used field angle is 2θ.

In a typical lens system, an amount of light is reduced as an angle with respect to an optical axis in the field is increased. Consequently, as a lens system with a wider field angle is used, a larger difference occurs in brightness between both ends of the image pickup device.

FIG. 19 schematically shows a configuration with an optical axis A directed to the center of a two-dimensional object. In a typical lens system, an image is not formed on an image pickup device I' but on a plane I in parallel with the two-dimensional object. In such a configuration, the formed image is distorted in a trapezoidal shape and the object is out of focus at both ends of the image pickup device.

When the inclined image surface is corrected, it is necessary to cancel the difference between an optical path L1 of a light ray passing at the top of the two-dimensional object S and an optical path L2 of a light ray passing at the bottom of the two-dimensional object S (to bring the two-dimensional object S on a plane S'). This correction, however, is difficult to perform by simple oblique image-taking.

In addition, when a shift lens is used in the image-taking optical system for oblique image-taking which is included, for example, in the image input apparatus proposed in Japanese Patent Application Laid-Open No. 10-341319, the height of the image-taking optical system from a two-dimensional object is not greatly different from that when the image-taking optical system faces the two-dimensional object. In view of the need to hold the image-taking optical system at that height, it is unlikely that the apparatus is significantly reduced in size.

SUMMARY OF THE INVENTION

The present invention provides an image-taking optical system which achieves a reduction in size, ensures a ratio of an amount of peripheral light, allows correction of trapezoidal distortion of a formed image, and is suitable for oblique image-taking, and an image input apparatus using the image-taking optical system.

Specifically, an image-taking optical system for forming an image of a two-dimensional object on an image-taking surface according to the present invention has a plurality of reflecting surfaces which reflect light from the two-dimensional object sequentially and guide the light to the image-taking surface, wherein a reference axis passing through the center of the pupil of the image-taking optical system and the center of the image formed on the image-taking surface is inclined with respect to the normal line of the two-dimensional object.

The characteristics of the image-optical system and the image input apparatus according to the present invention will be apparent from the following description of specific embodiments with reference to the drawings.

BRIEF DESCRIPTION OF THE DRAWINGS

FIG. 13 shows defocus characteristics of the image-taking optical system (in a second state) shown in FIG. 9;

FIG. 20 shows the height of an object and the height of an image when oblique image-taking is performed.

DESCRIPTION OF THE PREFERRED EMBODIMENTS

Hereinafter, preferred embodiments of the invention will be described in detail with reference to the drawings.

Figure 21:
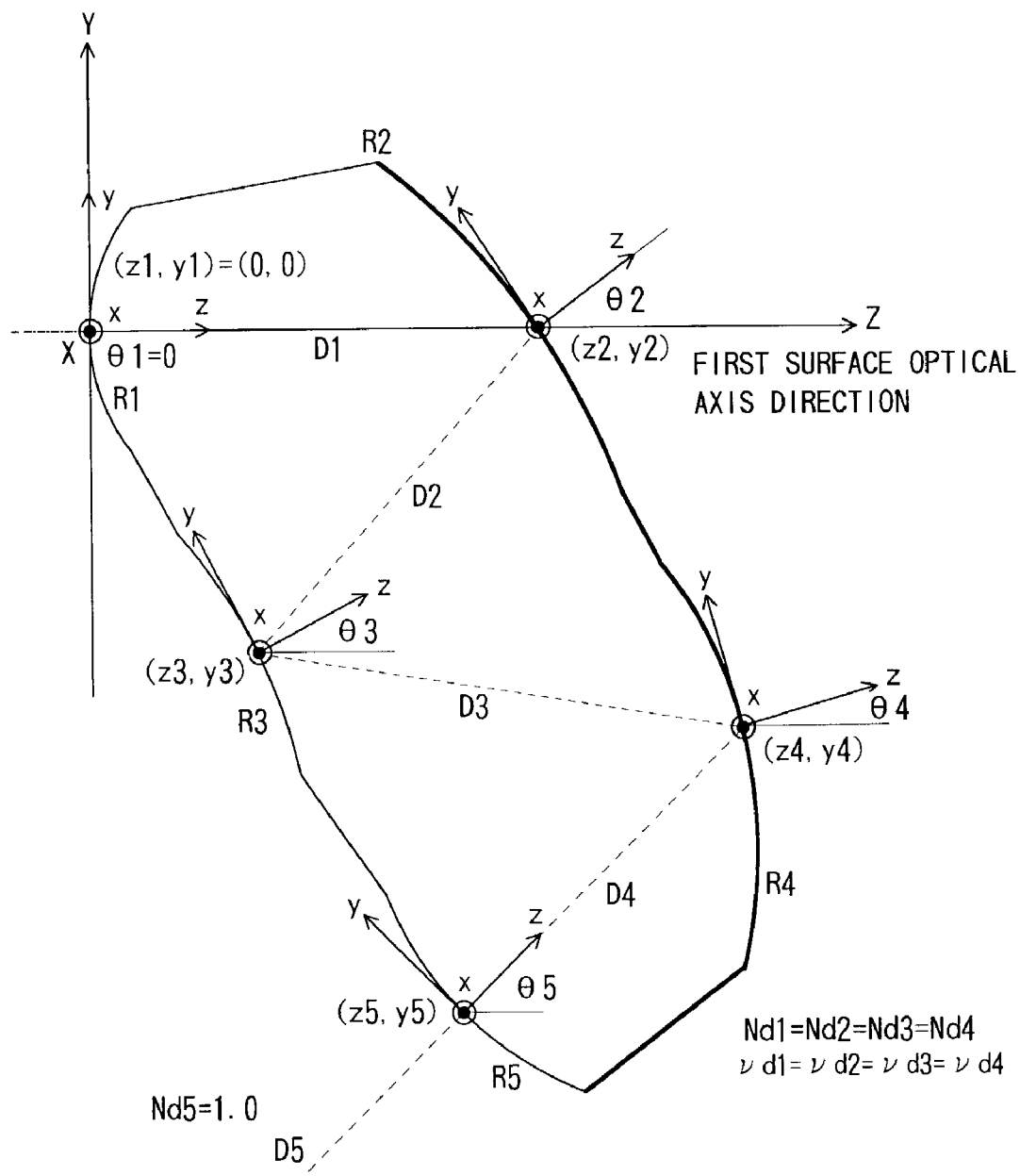
FIG. 21 is an explanatory view of a coordinate system in the image-taking optical system in the above respective embodiments.

Prior to the description of embodiments of the present invention, description is made for how to represent various fundamentals constituting the embodiments and matters common to the entire embodiments. FIG. 21 is an explanatory view of a coordinate system for defining data representing optical systems of the embodiments. In the embodiments of the present invention, an axis passing through the center of the pupil of an image-taking optical system with the center of an image formed on an image-taking surface of image pickup device (photoelectric converting element) is referred to as a reference axis which is shown by a dashed dotted line in FIG. 21.

In FIG. 21, a first surface R1 is a refraction surface, a second surface R2 is a reflection surface tilted with respect to the first surface R1, a third surface R3 and a fourth surface R4 are reflection surface shifted and tilted with respect to their preceding surfaces, and a fifth surface R5 is a refraction surface shifted and tilted with respect to the fourth surface R4.

Each of the first surface R1 to the fifth surface R5 is formed on a single optical element in a prism shape made of a medium such as glass and plastic, and the optical element is shown as a first optical element B in FIG. 21.

Specifically, in FIG. 21, the medium from an object surface (surface of a two-dimensional object), not shown, to the first surface R1 is made of air, the media from the first surface R1 to the fifth surface R5 are made of the common medium (glass or plastic), and the medium from the firth surface R5 to a sixth surface (image-taking surface) R6, not shown, is made of air.

Since the optical system of the embodiment is an off-axial optical system, the respective surfaces forming part of the optical system do not have a common optical axis. Thus, in the embodiment, an absolute coordinate system is defined to have the center of the first surface R1 set as its original point.

The path of a light ray (reference axis light ray) passing through the original point which is the center of the first surface R1 and the center of the final image-taking surface is defined as the reference axis of the optical system, and the reference axis is shown by the dashed dotted line in FIG. 21. The reference axis in the embodiment has a direction. The direction is the traveling direction of the reference axis light ray in forming an image.

While the reference axis serving as the reference of the optical system is defined herein as described above, a convenient axis may be determined as the axis serving as the reference of the optical system from the viewpoints of optical design, aberration correction, or representation of shapes of respective surfaces forming part of the optical system. Typically, the path of a light ray passing through the center of an image surface and the center of a stop or an entrance the pupil or an exit the pupil or the first surface of the optical system or the center of the final surface is defined as the reference axis serving as the reference of the optical system.

In the embodiment later described, as the reference axis is difined as a path of a light ray (reference axis light ray) subjected to refraction and reflection by each sequential refraction surface and reflection surface while the light ray passes from the center of the pupil of an image-taking optical system through the center of the first surface R1 to the center of the final image-taking surface (formed image). The respective surfaces are set in the order in which the reference axis light ray is subjected to the refraction and reflection.

Thus, the reference axis light ray finally reaches the center of the image surface after its direction is changed in accordance with the refraction or reflection rule in the set order of the respective surfaces.

All the tilted surfaces forming part of the optical system of the embodiment are basically tilted in the same plane. Thus, each axis of the absolute coordinate system is defined as follows.

Z axis: a straight line passing through the original point and the center of the object surface, and the direction from the object surface toward the first surface R1 is defined as positive.

Y axis: a straight line passing through the original point and forming an angle of 90 degrees counterclockwise with respect to the Z axis in the tilt plane (in the sheet of FIG. 21).

X axis: a straight line passing through the original point and orthogonal to each of the Z, Y axes (a straight line perpendicular to the sheet of FIG. 21).

For representing the shape of an i-th surface forming part of the optical system, it is easier to recognize the shape by setting a local coordinate system having an intersection of the reference axis and the i-th surface as its original point and representing the shape of the surface in the local coordinate system, rather than by representing the shape of the surface in the absolute coordinate system. Thus, the shape of the i-th surface is represented in the local coordinate system.

A tile angle in the YZ plane of the i-th surface is represented by an angle θi (in degrees (°)) in which a counterclockwise direction is defined as positive with respect to the Z axis of the absolute coordinate system. Thus, in the embodiment, the original point of the local coordinate for each surface is on the YZ plane in FIG. 21. No decentering of the surface exists in the XZ and ZY planes.

In addition, y, z axes of a local coordinate (x, y, z) of the i-th surface are inclined by an angle of θi in the YZ plane with respect to the absolute coordinate system (X, Y, Z), and specifically defined as follows.

z axis: a straight line passing through the original point of the local coordinate and forming an angle of θi counterclockwise in the YZ plane with respect to the Z direction of the absolute coordinate system.

y axis: a straight line passing through the original point of the local coordinate and forming an angle of 90 degrees counterclockwise in the YZ plane with respect to the z direction.

x axis: a straight line passing through the original point of the local coordinate and perpendicular to the YZ plane.

Di is a scalar quantity representing the spacing between the original pointals of local coordinates of an i-th surface and a (i+1) surface, and Ndi, νdi are a refractive index and an Abbe number of the medium between the i-th surface and the (i+1) surface.

A spherical surface is a shape represented by the following expression.

$$z = \frac{(x^2 + y^2)/Ri}{1 + \{1 - (x^2 + y^2)/Ri^2\}^{1/2}}$$

The optical system in the embodiment has at least one aspheric surface which is rotationally asymmetric, and its shape is represented by the following expression:

$$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 C60x^6$$

Since the above expression of the curved surface has only even-numbered order terms for x, the curved surface defined by the above curved surface expression is a plane-symmetric shape which has only the yz plane as a plane of symmetry. In addition, a shape symmetric with respect to the xz plane is represented when the following condition is satisfied:

C03=C21=t=0

Furthermore, a rotationally symmetric shape is represented when the following is satisfied, or a rotationally asymmetric shape is represented when the following is not satisfied:

C02=C20 C04=C40=C22/2

C06=C60=C24/3=C42/3

Figure 1:
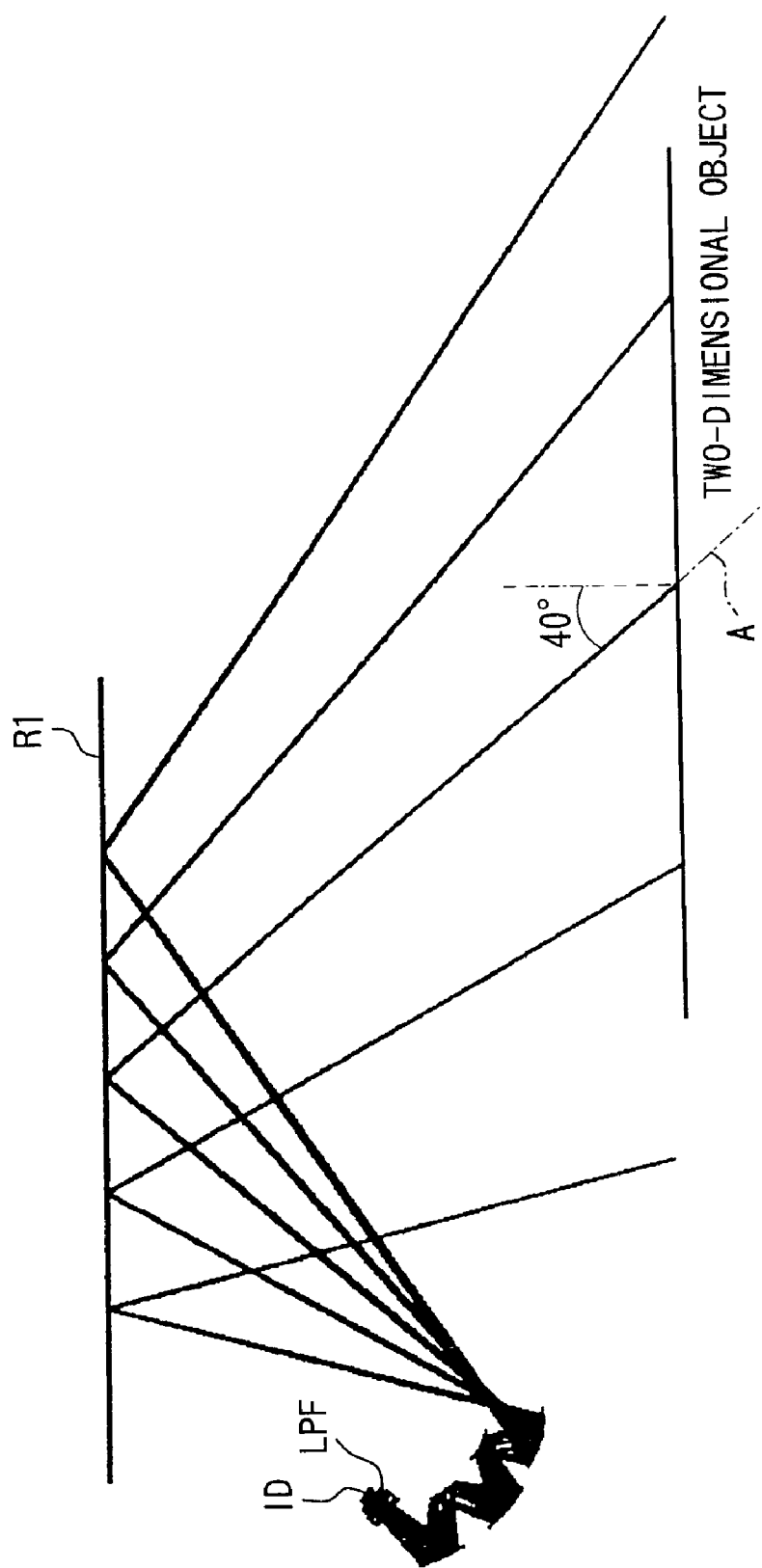
FIG. 1 shows an image-taking optical system which is an embodiment of the present invention.
Figure 2:
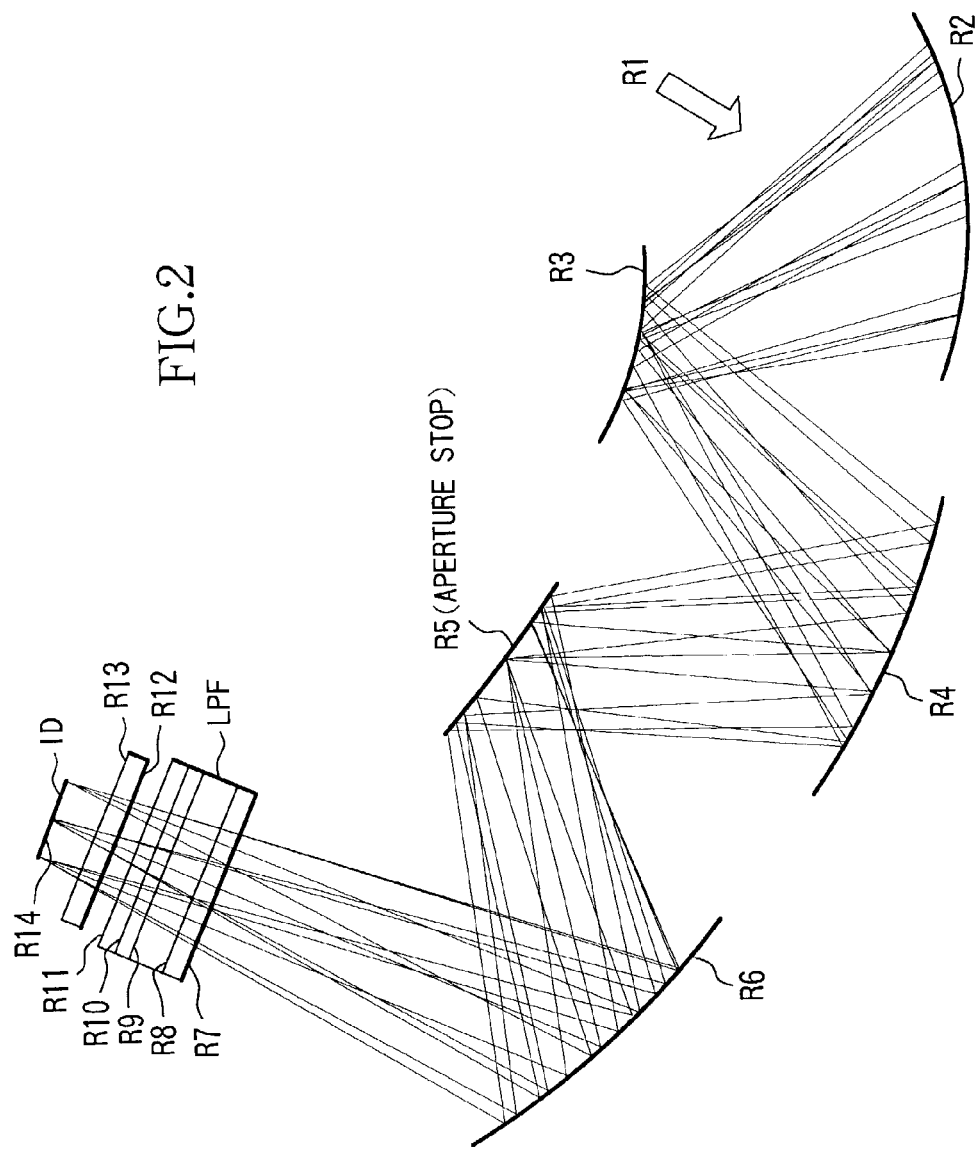
FIG. 2 is a partially enlarged view of the image-taking optical system shown in FIG. 1.

FIG. 1 shows an image-taking optical system which is an embodiment of the present invention, and FIG. 2 is a partially enlarged view of the image-taking optical system. In the embodiment, an image circle has a diameter of 4.5 mm, and the size of a two-dimensional object such as a paper document has a length-to-width ratio of 4:3 with a length of 300 mm and a width of 225 mm. The reference axis of the image-taking optical system is inclined by 40 degrees with respect to the normal line of the two-dimensional object.

In the following, data representing the image-taking optical system for use in the embodiment is provided.

| i | Yi | Zi | Si | Di | Ni | νi | |
|---|---|---|---|---|---|---|---|
| 1 | 0.00 | 0.00 | 0.00 | 110.74 | 1 | | reflecting surface |
| 2 | −71.18 | −84.83 | 16.62 | 12.15 | 1 | | reflecting surface |
| 3 | −72.61 | −72.76 | 30.47 | 13.13 | 1 | | reflecting surface |
| 4 | −84.75 | −77.74 | 42.74 | 12.76 | 1 | | reflecting surface |
| 5 | −80.85 | −65.59 | 55.79 | 12.93 | 1 | | reflecting surface/ Aperture stop |
| 6 | −93.75 | −64.73 | 66.90 | 11.15 | 1 | | reflecting surface |
| 7 | −85.04 | −54.35 | 40.00 | 0.67 | 1.54427 | 70.60 | refraction surface |
| 8 | −84.61 | −53.84 | 40.00 | 1.18 | 1.49400 | 75.00 | refraction surface |
| 9 | −83.85 | −52.93 | 40.00 | 0.53 | 1.54427 | 70.60 | refraction surface |
| 10 | −83.51 | −52.53 | 40.00 | 0.67 | 1.54427 | 70.60 | refraction surface |
| 11 | −83.08 | −52.01 | 40.00 | 0.66 | 1 | | refraction surface |
| 12 | −82.66 | −51.51 | 40.00 | 0.66 | 1.51633 | 0.00 | refraction surface |
| 13 | −82.24 | −51.01 | 40.00 | 1.53 | 1 | | refraction surface |
| 14 | −81.25 | −49.84 | 40.00 | | 1 | | image surface |

Aspheric Shape

R2 surface

C02 = 3.27718e−002   C20 = 5.02878e−002
C03 = 9.00715e−004   C21 = 2.08525e−003
C04 = 6.83861e−005   C22 = 1.64489e−004   C40 = 4.92722e−006
C05 = 3.91063e−006   C23 = 5.11076e−006   C41 = 3.12570e−007
C06 = 4.32939e−007   C24 = 1.05259e−007   C42 = −2.18505e−007
C60 = 6.04627e−007

R3 surface

C02 = 4.18012e−002   C20 = 3.36416e−002
C03 = −8.77020e−004  C21 = 2.08725e−003
C04 = 3.36150e−004   C22 = −9.25066e−005  C40 = −4.82422e−004
C05 = −2.31710e−005  C23 = 2.69055e−004   C41 = 7.80104e−005
C06 = 2.92947e−005   C24 = −3.75948e−005  C42 = 2.84797e−005
C60 = 7.48028e−006

R4 surface

C02 = 1.87194e−002   C20 = 2.44720e−002
C03 = 7.86803e−005   C21 = 8.50740e−005
C04 = 2.87959e−005   C22 = 4.96691e−005   C40 = 1.49854e−005
C05 = 7.09640e−007   C23 = 1.94439e−007   C41 = 7.42850e−007
C06 = −1.10845e−007  C24 = 2.25807e−007   C42 = 2.76201e−007
C60 = 3.63567e−008

R5 surface

C02 = 9.53080e−003   C20 = 3.51971e−002
C03 = 6.85490e−004   C21 = 1.21162e−003
C04 = 1.31464e−004   C22 = 3.74009e−004   C40 = 1.71169e−004
C05 = 4.69853e−006   C23 = 2.47791e−005   C41 = 3.69162e−005
C06 = 1.39052e−006   C24 = 4.35217e−006   C42 = 6.47944e−006
C60 = 8.98396e−007

R6 surface

C02 = 1.64873e−002   C20 = 2.50804e−002
C03 = 3.23358e−004   C21 = 1.97130e−004
C04 = −1.24353e−006  C22 = 3.54343e−005   C40 = 2.49315e−005
C05 = −9.25020e−007  C23 = −4.24739e−007  C41 = 1.75014e−007
C06 = 1.20497e−007   C24 = 6.14460e−007   C42 = 1.69399e−007
C60 = −9.97822e−010

In FIGS. 1 and 2, the image-taking optical system R1 to R6 comprise six reflecting surfaces of a plane mirror R1, a concave mirror R2, a convex mirror R3, a concave mirror R4, a convex mirror surface R5 (aperture stop), and a concave mirror R6 in the order in which a light ray from the two-dimensional object passes through. Each of the curved reflecting surfaces (mirrors) R2 to R6 is symmetric only with respect to the YZ plane, that is, a rotationally asymmetric surface having a single plane of symmetry.

The aperture stop in the embodiment is disposed on the convex mirror R5. It is thus possible to reduce the number of parts.

The aperture stop in the embodiment does not play a role in adjusting the amount of light incident on the image-taking optical system, and the necessary adjustment of a light amount is achieved by electrical correction or the like with an image pickup device ID.

Next, the optical action in the embodiment is described. Light flux from the two-dimensional object such as a paper document passes through the image-taking optical system including the reflecting surfaces (mirrors) R1 to R6 and a low pass filter LPF to form an optical image on the image pickup device ID.

Figure 3:
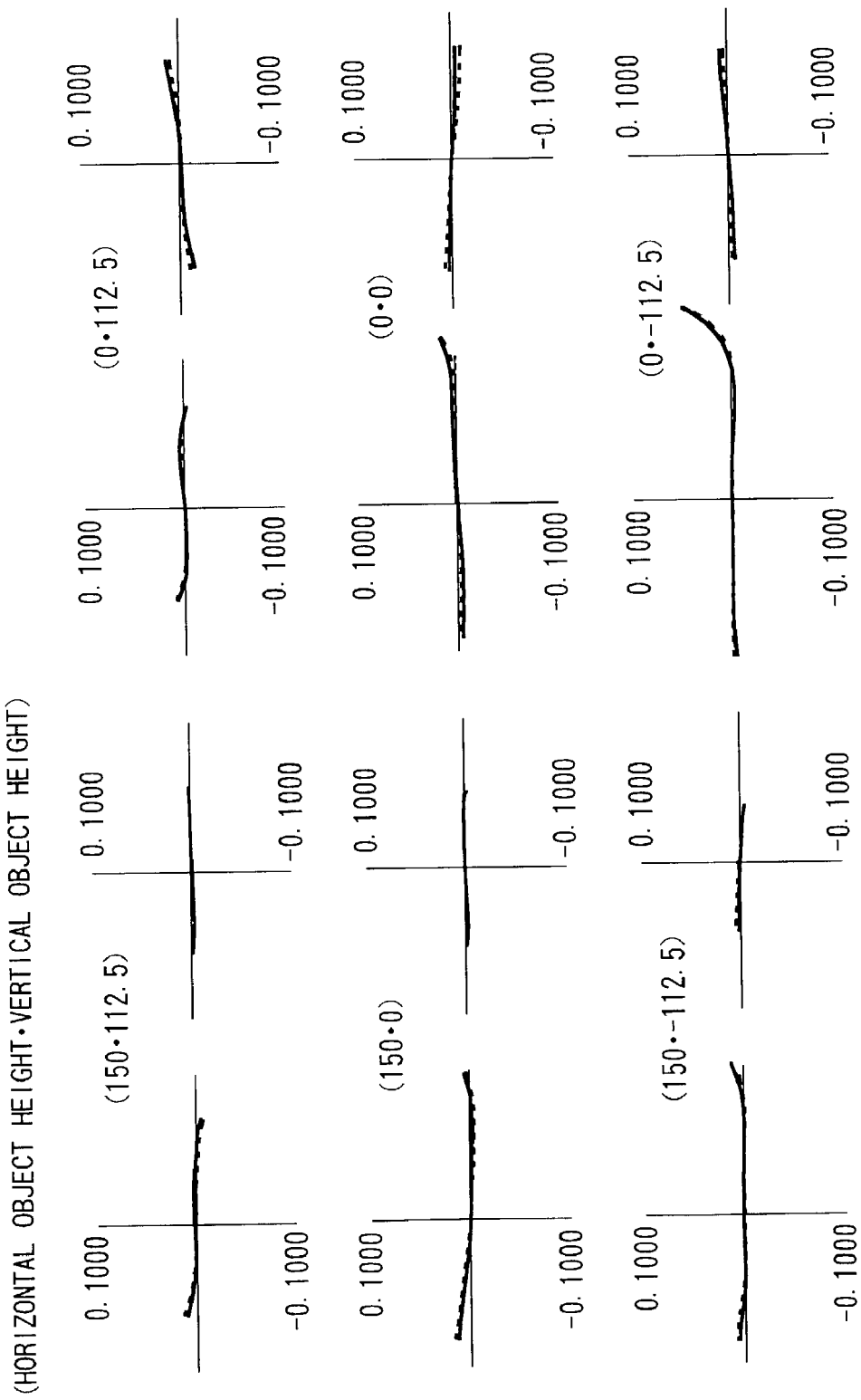
FIG. 3 shows distortion of the image-taking optical system shown in FIG. 1.

FIG. 3 shows lateral aberration on the image pickup device ID. In the diagrams of the lateral aberration, the horizontal axis represents the height of incidence on the pupil, while the vertical axis represents an amount of aberration.

Figure 4:
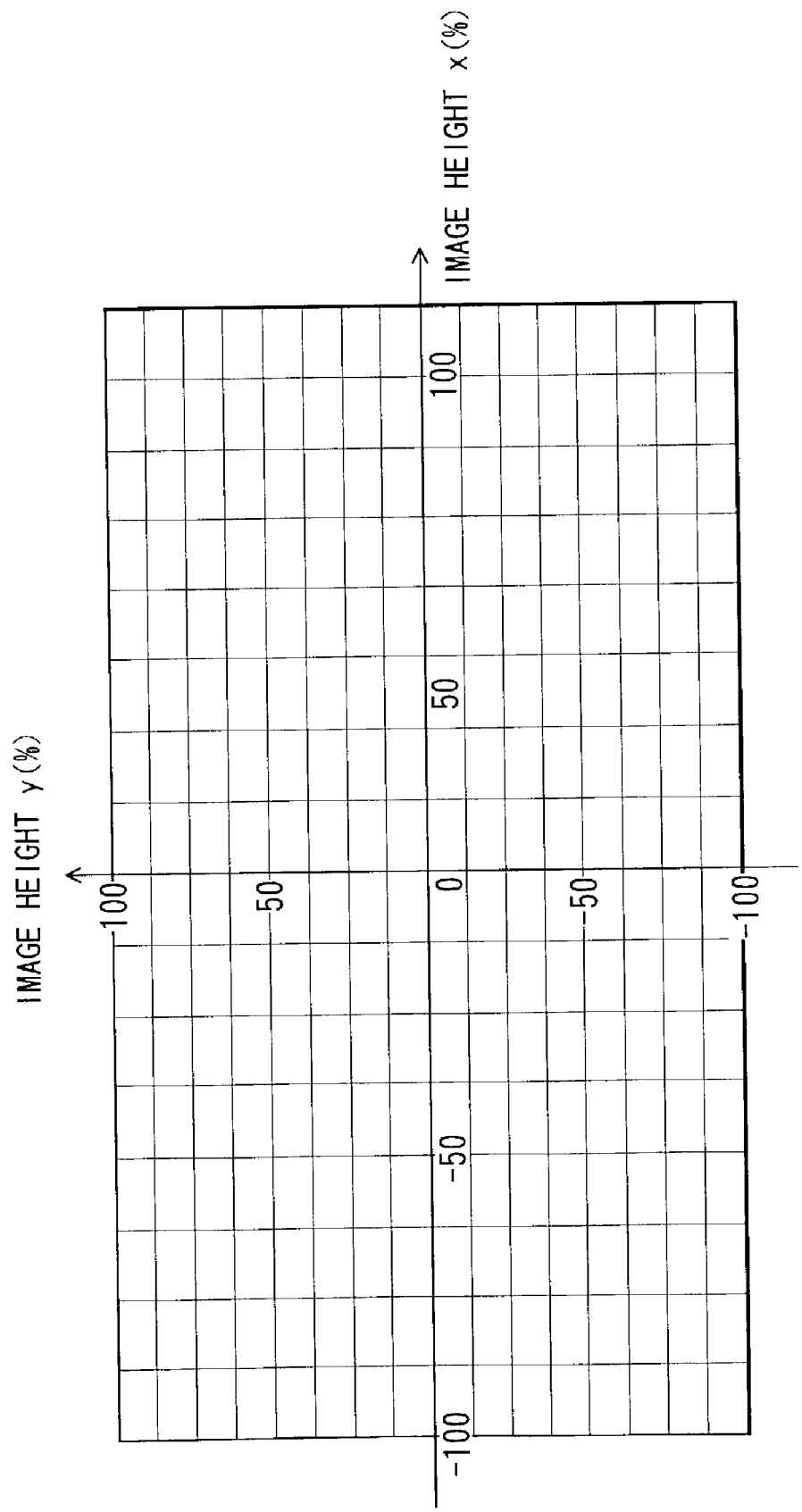
FIG. 4 shows lateral aberration of the image-taking optical system shown in FIG. 1.

FIG. 4 shows distortion of the image on the image pickup device ID. As seen from FIG. 4, the optical image formed on the image pickup device ID does not include large distortion, and includes little asymmetric distortion.

In this and respective embodiments later described, the following condition may be satisfied:

$$|1-\cos\theta \cdot \beta(\alpha)/\beta(\alpha+90°)|<0.2 \quad (1)$$

where $\theta$ is an angle of inclination of the reference axis with respect to the normal line of the two-dimensional object, $\alpha$ is an azimuth representing a plane including the reference axis and the normal line of the two-dimensional object, and $\beta(\xi)$ is a magnification of the image-taking optical system at an azimuth $\xi°$ around the reference axis.

In the image-taking optical system used in the embodiment, the value of the following term in the expression (1) is verified:

$$|1-\cos\theta \cdot \beta(\alpha)'/\beta(\alpha+90°)'|$$

In the expression, $\beta(\alpha)'$ represents a magnification of the image-taking optical system for image formation between an object surface and an image-forming surface which are orthogonal to the reference axis of the image-taking optical system at an azimuth $\alpha$. The magnification for image formation is evaluated in a plane orthogonal to the reference axis in a paraxial region and represented as the following expression (2) in the vertical and horizontal directions of the two-dimensional object (see FIG. 20).

When an object height Ys of the two-dimensional object S inclined from the reference axis is projected on a plane S' orthogonal to the reference axis A, and the following expression (3) must be satisfied to maintain the length-to-width ratio of the two-dimensional object S.

From above, the following expression (4) holds, and the expression (1) is derived as a condition for maintaining the length-to-width ratio of the two-dimensional object on the image-forming surface (image-taking surface) through the image-taking optical system having the reference axis inclined to the normal line of the two-dimensional object.

$$\beta y' = Yi'/Ys'$$

$$\beta x' = Xi/Xs' \quad (2)$$

$$Yi'/Xi' = Ys/Xs' \quad (3)$$

$$By' \cdot \cos\theta = \beta x' \quad (4)$$

Focal lengths f(0), f(90) at azimuths of 0 and 90 degrees around the reference axis, distances ss(0), ss(90) from the front principal point to the object surface, and magnifications $\beta(0)$, $\beta(90)$ at azimuths of 0 and 90 degrees are represented by:

$$f(0)=-3.872, f(90)=-3.019$$

$$ss(0)=244.92, s(90)=250.743$$

$$\beta y'=\beta(0)'=f(0)/(f(0)+ss(0))=-0.016063$$

$$\beta x'=\beta(90)'=f(90)/(f(90)+ss(90))=-0.012187$$

Thus, the following expression holds:

$$|1-(\beta(0)'\cdot\cos(40°))/\beta(90)'|=0.00968 \quad (5)$$

The condition for maintaining the length-to-width ratio of the image of the two-dimensional object is that the value resulting from the aforementioned expression (5) is small. If the value from the expression (5) is larger than 0.2, distortion is large and correction of aberration is difficult.

While the aperture stop in the embodiment is disposed on the reflecting surface and does not has a function of adjusting the amount of light incident on the image-taking optical system, an aperture stop having a function of adjusting the amount of light amount may be disposed in contact with the reflecting surface.

While the surface R1 is the plane mirror in the embodiment, it may be implemented by a curved reflecting surface. In this case, a higher degree of flexibility in design can achieve a higher performance image-taking optical system.

Figure 5:
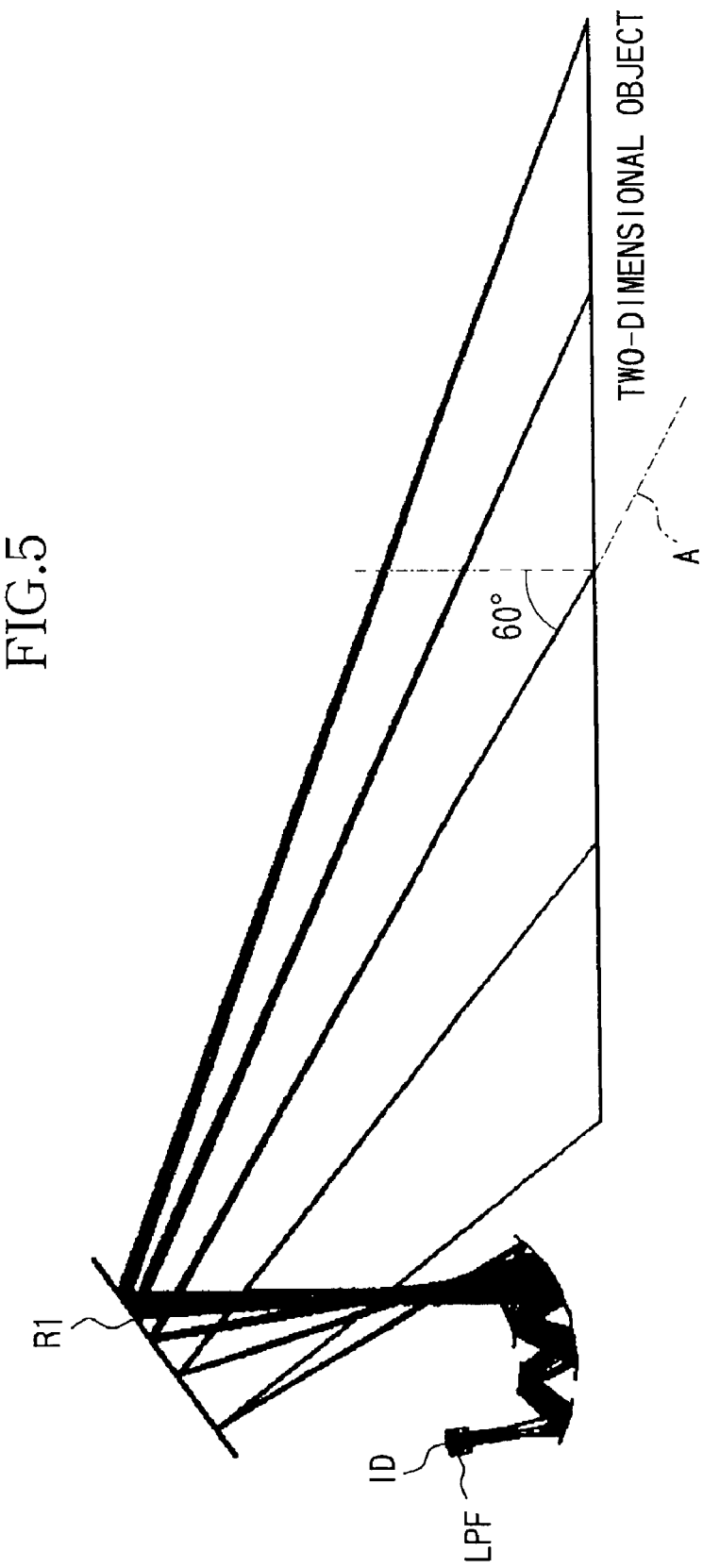
FIG. 5 shows an image-taking optical system according to another embodiment of the present invention.
Figure 6:
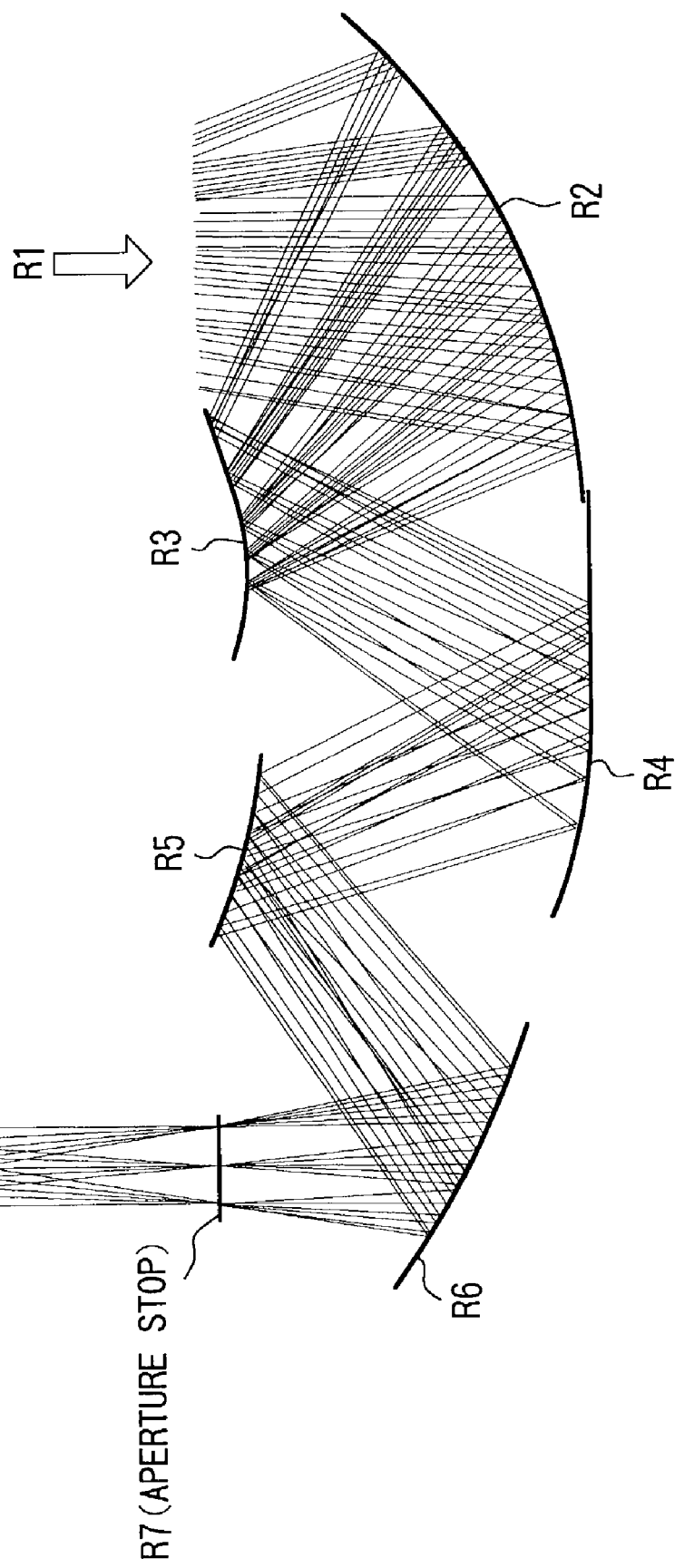
FIG. 6 is a partially enlarged view of the image-taking optical system shown in FIG. 5.

FIG. 5 shows an image-taking optical system according to another embodiment of the present invention, and FIG. 6 is a partially enlarged view of the image-taking optical system.

In the embodiment, an image circle has a diameter of 4.5 mm, and the size of a two-dimensional object has a length-to-width ratio of 4:3 with a length of 300 mm and a width of 225 mm. The reference axis of the image-taking optical system is inclined by 60 degrees with respect to the normal to the two-dimensional object. In the following, data representing the image-taking optical system for use in the embodiment is provided.

Aperture stop: Elliptic Shape, Major Axis: 2.670 mm
Minor Axis: 1.320 mm
Diameter of The pupil 1.08

| i | Yi | Zi | Si | Di | Ni | vi |
|---|---|---|---|---|---|---|
| 1 | 0.00 | 0.00 | 0.00 | 70.00 | 1 | reflecting surface |
| 2 | −34.12 | −73.17 | 1.62 | 24.39 | 1 | reflecting surface |
| 3 | −39.18 | −60.49 | 15.47 | 13.13 | 1 | reflecting surface |
| 4 | −49.62 | −68.44 | 27.57 | 12.76 | 1 | reflecting surface |
| 5 | −49.08 | −55.69 | 40.60 | 12.93 | 1 | reflecting surface |

-continued

| | | | | | | |
|---|---|---|---|---|---|---|
| 6 | −61.76 | −58.21 | 51.88 | 8.53 | 1 | reflecting surface |
| 7 | −58.15 | −50.49 | 25.00 | 11.26 | 1 | aperture stop |
| 8 | −53.39 | −40.28 | 25.01 | 0.67 | 1.54427 | 70.60 refraction surface |
| 9 | −53.11 | −39.67 | 25.01 | 1.18 | 1.49400 | 75.00 refraction surface |
| 10 | −52.61 | −38.60 | 25.01 | 0.53 | 1.54427 | 70.60 refraction surface |
| 11 | −52.39 | −38.13 | 25.01 | 0.67 | 1.54427 | 70.60 refraction surface |
| 12 | −52.11 | −37.52 | 25.01 | 0.66 | 1 | refraction surface |
| 13 | −51.83 | −36.92 | 25.01 | 0.66 | 1.51633 | 0.00 refraction surface |
| 14 | −51.55 | −36.33 | 25.01 | 0.19 | 1 | refraction surface |
| 15 | −51.41 | −36.04 | 25.01 | | 1 | image surface |

Aspheric Shape

R2 surface

C02 = 2.00093e−002    C20 = 4.54164e−002
C03 = 1.45374e−004    C21 = 1.62184e−003
C04 = 2.41290e−005    C22 = 1.05834e−004    C40 = −6.58135e−005
C05 = 5.40990e−007    C23 = 4.29690e−006    C41 = −2.76353e−006
C06 = 1.78160e−008    C24 = 2.32554e−007    C42 = −4.92863e−008
C60 = 1.25180e−006

R3 surface

C02 = 3.11228e−002    C20 = 1.77684e−002
C03 = −4.28789e−003   C21 = −3.03858e−005
C04 = 4.81794e−004    C22 = −1.57518e−005   C40 = −1.60477e−004
C05 = −1.56591e−005   C23 = 1.44330e−005    C41 = 1.23976e−005
C06 = −1.95873e−006   C24 = −2.66013e−007   C42 = −3.68645e−006
C60 = −6.02054e−007

R4 surface

C02 = 1.18076e−002    C20 = 2.04974e−002
C03 = −9.25910e−004   C21 = −5.42677e−004
C04 = −2.42266e−005   C22 = 1.84491e−005    C40 = 1.78787e−005
C05 = 1.24540e−006    C23 = −1.65304e−006   C41 = −5.22550e−007
C06 = 1.97241e−007    C24 = 7.76516e−009    C42 = −1.05988e−009
C60 = −3.30020e−008

R5 surface

C02 = 1.27608e−002    C20 = 4.15932e−002
C03 = −1.74425e−005   C21 = 1.44207e−004
C04 = 9.44440e−005    C22 = 3.00892e−004    C40 = 3.03001e−004
C05 = −1.32951e−006   C23 = −2.87033e−005   C41 = −1.01411e−005
C06 = 6.31632e−007    C24 = 6.90852e−006    C42 = 7.65376e−006
C60 = 1.32444e−006

R6 surface

C02 = 1.83302e−002    C20 = 2.45279e−002
C03 = 3.29924e−006    C21 = 6.69423e−005
C04 = 1.26012e−005    C22 = 2.64329e−005    C40 = 2.03266e−005
C05 = −1.58275e−007   C23 = −1.45094e−006   C41 = −4.08603e−007
C06 = 1.15476e−009    C24 = 2.42976e−007    C42 = 2.15817e−007
C60 = 3.74544e−008

In FIGS. 5 and 6, the image-taking optical system comprises six reflecting surfaces of a plane mirror R1, a concave mirror R2, a convex mirror R3, a concave mirror R4, a convex mirror R5, and a concave mirror R6 in the order in which a light ray from the two-dimensional object passes through. An aperture stop capable of adjusting an amount of light is disposed between the final reflecting surface (mirror) R6 and an image pickup device ID. Each of the curved reflecting surfaces (mirrors) R2 to R6 is symmetric only with respect to the YZ plane, that is, a rotationally asymmetric surface.

In the embodiment, the aperture stop is disposed between the image pickup device ID and the final rotationally asymmetric reflecting surface R6. This enables integral fabrication of a plurality of rotationally asymmetric reflecting surfaces R2 to R6 having curvature.

If the aperture stop is provided between the reflecting surface R1 by which the light flux is first reflected out of the aforementioned reflecting surfaces and the two-dimensional object, a difference in brightness occurs between a top portion and a bottom portion of an image surface due to a difference in area of the pupil or solid angle formed by light flux passing at the top of the two-dimensional object and light flux passing at the bottom of the two-dimensional object. Thus, the aperture stop provided at that position is not preferable.

Next, the optical action in the embodiment is described. Light flux from the two-dimensional object passes through the image-taking optical system including the reflecting surfaces R1 to R6 and a low pass filter LPF to form an image on the image pickup device ID.

Figure 7:
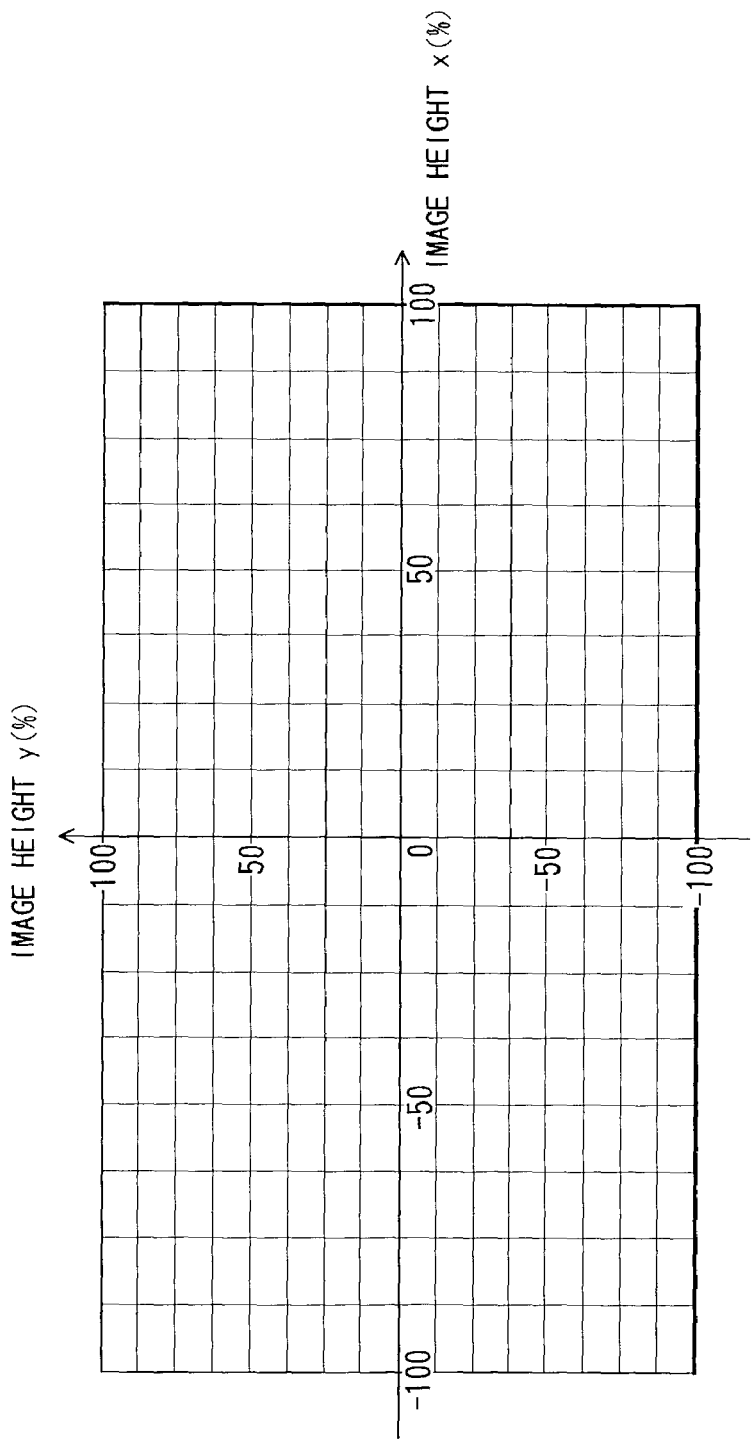
FIG. 7 shows distortion of the image-taking optical system shown in FIG. 5.

FIG. 7 shows distortion of the image formed on the image pickup device ID. As seen from FIG. 7, the formed image does not include large distortion, and includes little asymmetric distortion.

Figure 8:
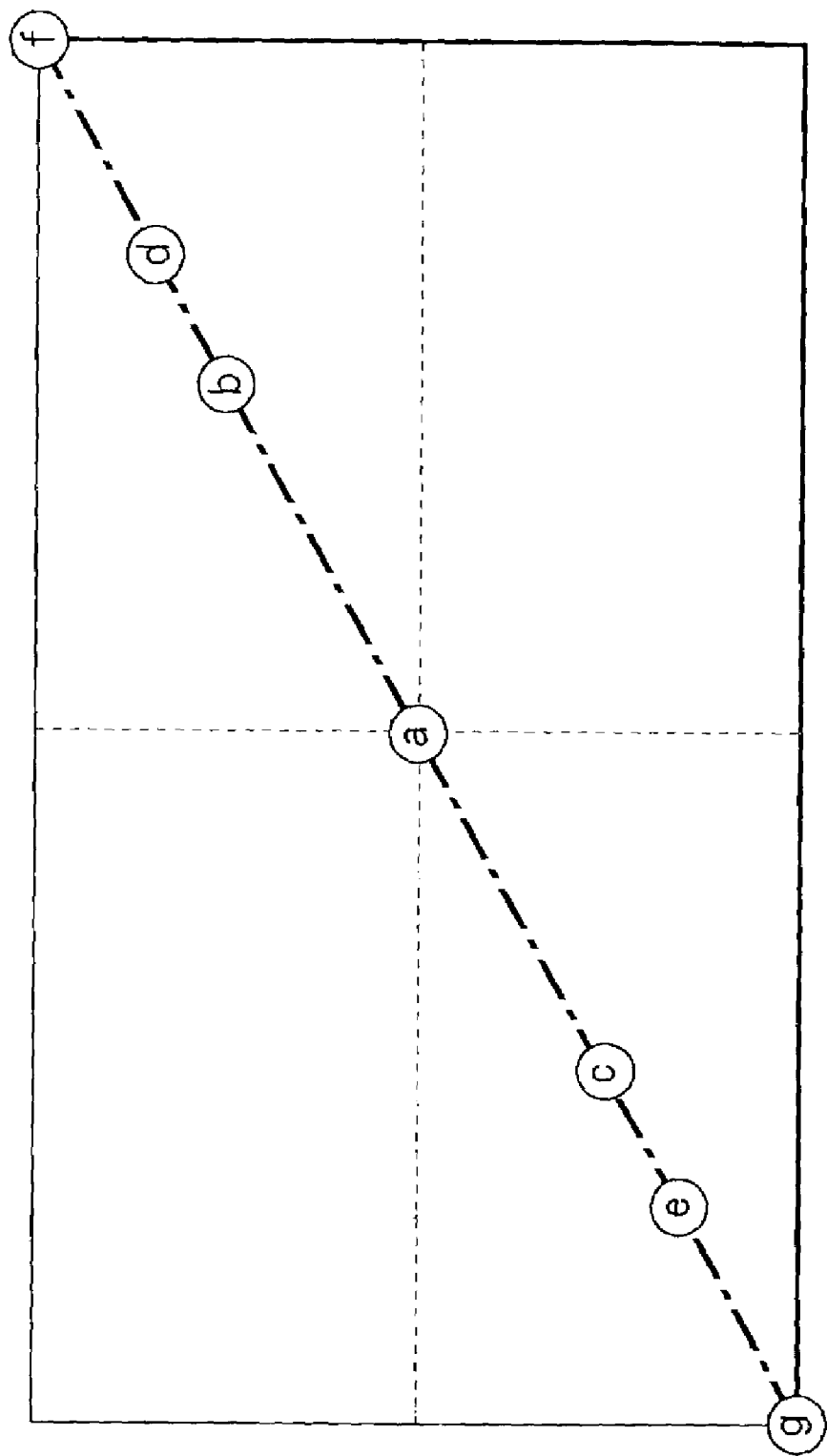
FIG. 8 shows positions on an image pickup device at which a ratio of a light amount is evaluated in the image-taking optical system shown in FIG. 5.

The following are ratios the amount of light at respective positions shown in FIG. 8 in the formed image. The ratios of light amounts are represented when a ratio of the amount of light at the center (a) of the field angle is 100.

(a)=100, (b)=97.7, (c)=97.7, (d)=93.4, (e)=94.9, (f)=59.5, (g)=61.0

A significant reduction is not seen in the amount of light at the respective positions (especially at the positions (d) to (g)) in comparison with the generally known cosine fourth-power law (the law that an image at an off-axial object point incident on an entrance the pupil at an angle of ω becomes darker in proportion to $\cos^4 \omega$)

In the image-taking optical system used in the embodiment, focal lengths f(0), f(90) at azimuths of 0 and 90 degrees around the reference axis, distances ss(0), ss(90) from the front principal point to the object surface, and magnifications β(0), β(90) at the azimuths of 0 and 90 degrees are represented by:

$$f(0)=-5.547,\ f(90)=-3.012$$

$$ss(0)=227.182,\ s(90)=250.362$$

$$\beta y'=\beta(0)'=f(0)/(f(0)+ss(0))=-0.025027$$

$$\beta x'=\beta(90)'=f(90)/(f(90)+ss(90))=-0.012177$$

Thus, the following expression holds:

$$|1-(\beta(0)'\cdot\cos(60°))/\beta(90)'|=0.0276 \qquad (6)$$

The condition for maintaining the length-to-width ratio of the image of the two-dimensional object is that the value resulting from the aforementioned expression (6) is small. If the value from the expression (6) is larger than 0.2, distortion is large and correction of aberration is difficult.

While the aperture stop in the embodiment plays a role in adjusting the amount of light incident on the image-taking optical system, the aperture stop may be realized by an opening which does not have such a role. In this case, the necessary adjustment of a light amount is achieved by electrical correction or the like with the image pickup device.

While the surface R1 is the plane mirror in the embodiment, it may be implemented by a reflecting surface having curvature. In this case, a higher degree of flexibility in design can achieve a higher performance image-taking optical system.

Figure 9:
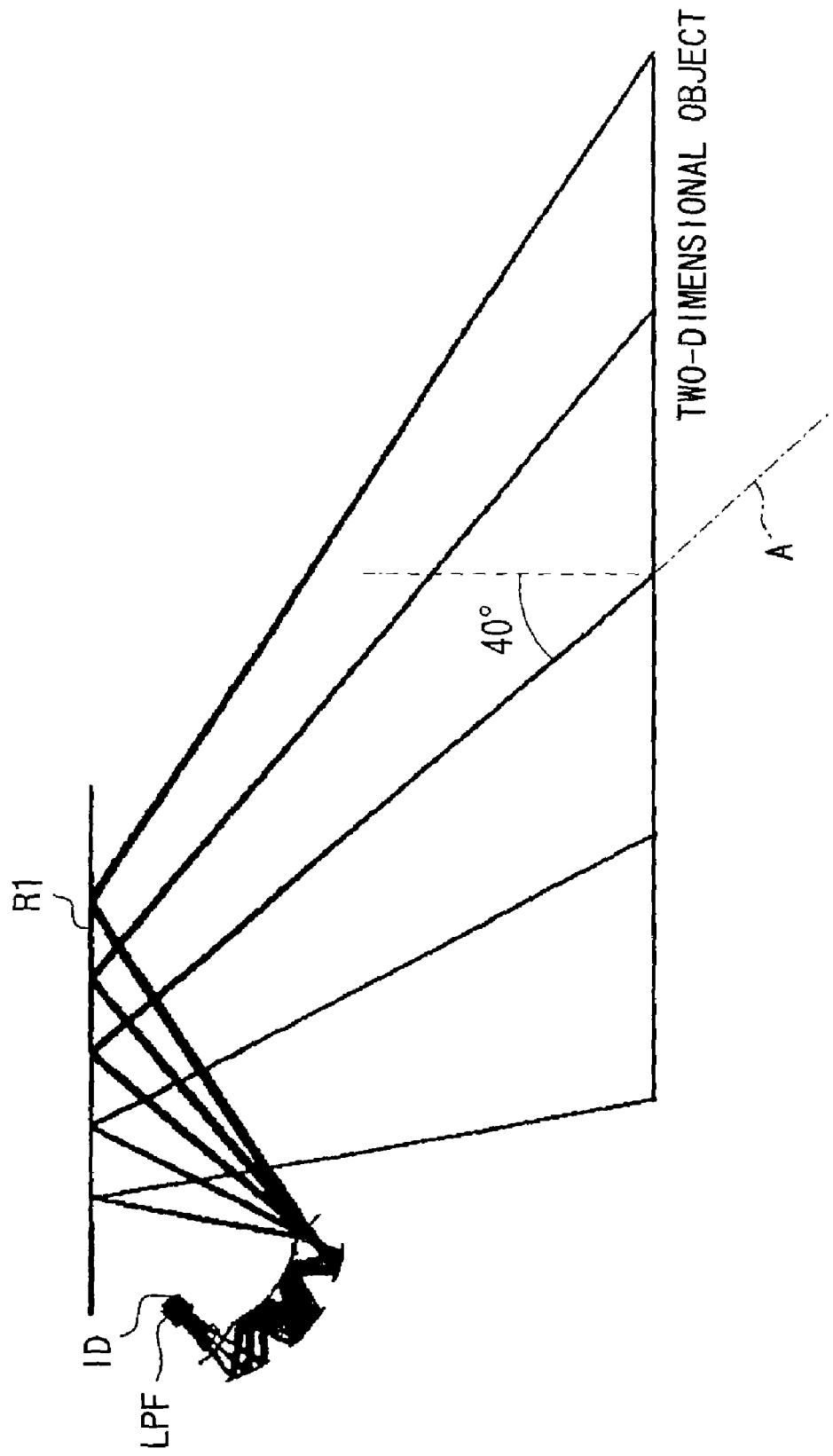
FIG. 9 shows an image-taking optical system according to yet another embodiment of the present invention.
Figure 10:
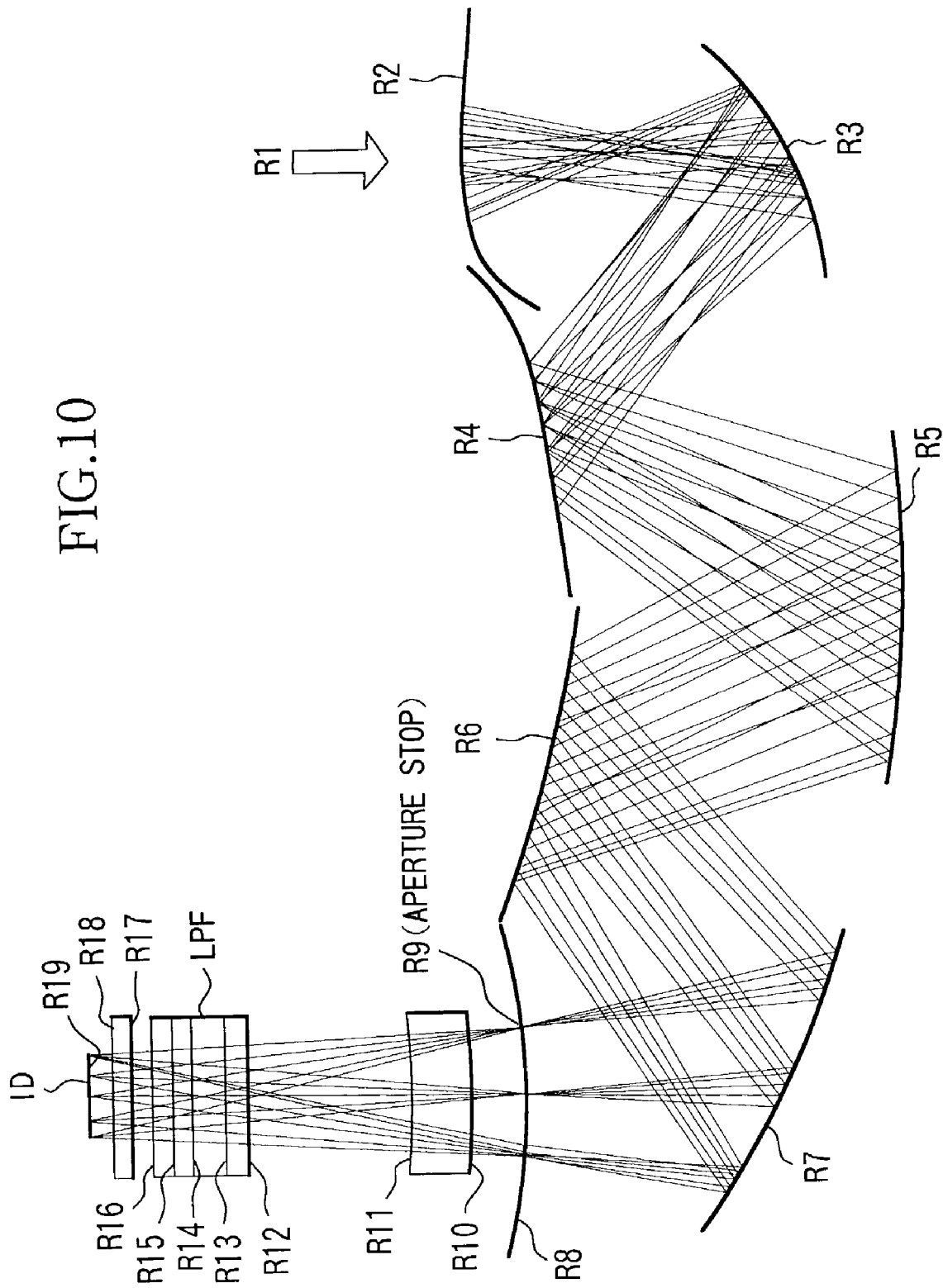
FIG. 10 is a partially enlarged view of the image-taking optical system shown in FIG. 9.

FIG. 9 shows an image-taking optical system according to yet another embodiment of the present invention, and FIG. 10 is a partially enlarged view of the image-taking optical system. The embodiment provides a focusing function when the distance between a two-dimensional object and an optical surface by which light flux from the two-dimensional object is first reflected is 160 mm (state 1) to 200 mm (state 2).

In the embodiment, an image circle has a diameter of 4.5 mm, and the size of a two-dimensional object has a length-to-width ratio of 4:3 with a length of 300 mm and a width of 225 mm. The reference axis of the image-taking optical system is inclined by 40 degrees with respect to the normal line of the two-dimensional object. In the following, data representing the image-taking optical system for use in the embodiment is provided.

The defining data in state 1 is shown below. In state 2, Di of the 9th surface should be 1.67.

Aperture stop: Elliptic Shape, Major Axis: 2.607 mm
Minor Axis: 2.068 mm
Diameter of The pupil 1.08

| i | Yi | Zi (W) | Si | Di | Ni | vi | |
|---|---|---|---|---|---|---|---|
| 1 | 0.00 | 0.00 | 0.00 | 60.00 | 1 | | reflecting surface |
| 2 | −38.57 | −45.96 | 40.00 | 10.74 | 1.55880 | 62.55 | refraction surface |
| 3 | −45.47 | −54.19 | 16.70 | 12.15 | 1.55880 | 62.55 | reflecting surface |
| 4 | −46.87 | −42.11 | 30.54 | 13.13 | 1.55880 | 62.55 | reflecting surface |
| 5 | −59.01 | −47.10 | 42.57 | 12.76 | 1.55880 | 62.55 | reflecting surface |
| 6 | −55.18 | −34.92 | 55.59 | 12.93 | 1.55880 | 62.55 | reflecting surface |
| 7 | −68.08 | −34.08 | 66.89 | 8.53 | 1.55880 | 62.55 | reflecting surface |
| 8 | −62.60 | −27.55 | 40.00 | 0.24 | 1 | | refraction surface |
| 9 | −62.44 | −27.37 | 40.05 | 1.52 | 1 | | aperture stop |
| 10 | −61.46 | −26.20 | 40.05 | 2.00 | 1.48749 | 70.40 | refraction surface |
| 11 | −60.18 | −24.67 | 40.05 | 8.96 | 1 | | refraction surface |
| 12 | −56.67 | −20.51 | 40.05 | 0.67 | 1.54427 | 70.60 | refraction surface |
| 13 | −56.24 | −19.99 | 40.05 | 1.18 | 1.49400 | 75.00 | refraction surface |
| 14 | −55.48 | −19.09 | 40.05 | 0.53 | 1.54427 | 70.60 | refraction surface |
| 15 | −55.14 | −18.69 | 40.05 | 0.67 | 1.54427 | 70.60 | refraction surface |
| 16 | −54.71 | −18.17 | 40.05 | 0.66 | 1 | | refraction surface |
| 17 | −54.29 | −17.67 | 40.05 | 0.66 | 1.51633 | 0.00 | refraction surface |
| 18 | −53.87 | −17.17 | 40.05 | 0.34 | 1 | | refraction surface |
| 19 | −53.36 | −16.57 | 40.05 | | 1 | | image surface |

Spherical Shape

R10 = surface r10 = 16.165
R11 = surface r11 = 14.529

Aspheric Shape

R2 surface

C02 = −4.00714e−002　C20 = −2.17847e−002
C03 = 1.13588e−003　C21 = −8.02929e−004
C04 = 1.66296e−004　C22 = −1.45846e−003　C40 = −2.51991e−004
C05 = 2.86738e−004　C23 = −1.01420e−004　C41 = −3.44356e−005
C06 = −3.77408e−005　C24 = −1.36880e−005　C42 = 1.22231e−005
C60 = −1.33753e−006

R3 surface

C02 = 3.91912e−002　C20 = 5.60289e−002
C03 = 1.85083e−003　C21 = 6.42029e−003
C04 = 1.70818e−004　C22 = 2.33623e−004　C40 = 1.94417e−005
C05 = 2.52834e−005　C23 = −3.22231e−005　C41 = −2.25402e−006
C06 = 2.88235e−006　C24 = −1.14606e−005　C42 = −9.22096e−006
C60 = −8.45182e−006

R4 surface

C02 = 1.54009e−002　C20 = −4.30633e−003
C03 = 2.70166e−003　C21 = −2.25137e−003
C04 = 1.57847e−004　C22 = −2.12499e−004　C40 = −9.59707e−006
C05 = 2.43881e−005　C23 = −4.14062e−005　C41 = −9.37147e−006
C06 = 2.50523e−006　C24 = −5.19582e−006　C42 = 2.31168e−006
C60 = 1.76005e−006

R5 surface

C02 = 1.43701e−002　C20 = 1.56114e−002
C03 = −1.39593e−005　C21 = −9.51830e−004
C04 = −1.12826e−006　C22 = −1.14082e−005　C40 = 5.70639e−006
C05 = 3.30933e−007　C23 = −2.74918e−006　C41 = −1.35011e−006
C06 = −3.57003e−008　C24 = −1.38075e−007　C42 = −2.83000e−008
C60 = 9.54480e−008

R6 surface

C02 = 8.82536e−003　C20 = 3.23753e−002
C03 = −2.93698e−005　C21 = −9.90213e−004
C04 = 1.45641e−005　C22 = 2.48759e−004　C40 = 1.66218e−004
C05 = 3.57391e−007　C23 = −1.85666e−005　C41 = −2.06197e−005
C06 = 1.60483e−008　C24 = 4.58382e−007　C42 = 1.89905e−006
C60 = 2.11347e−006

R7 surface

C02 = 1.51965e−002　C20 = 2.38667e−002
C03 = −2.53147e−005　C21 = −2.89916e−005
C04 = 4.71439e−006　C22 = 3.17528e−005　C40 = 1.85484e−005
C05 = −5.90686e−008　C23 = −1.93515e−006　C41 = −7.68152e−007
C06 = 2.23039e−008　C24 = 7.36422e−008　C42 = 4.42176e−008
C60 = 4.71073e−008

R8 surface

C02 = 2.69100e−002　C20 = 2.84156e−002
C03 = −2.26234e−005　C21 = 1.10250e−004
C04 = −7.84700e−005　C22 = 2.98521e−005　C40 = −1.75576e−006
C05 = −6.11379e−006　C23 = −2.56512e−005　C41 = −1.42299e−005
C06 = 0.00000e+000　C24 = 0.00000e+000　C42 = 0.00000e+000
C60 = 2.32185e−006

In FIGS. 9 and 10, the image-taking optical system comprises a transparent body in a prism shape having a plane mirror R1, a convex refraction surface R2, a concave mirror R3, a convex mirror R4, a concave mirror R5, a convex mirror R6, a concave mirror R7, and convex refraction surface R8, an aperture stop R9 capable of adjusting an amount of light, and a meniscus lens having a convex refraction surface R10 and a convex refraction surface R11, in the order in which light flux ray from the two-dimensional object passes through. Each of the optical surfaces is symmetric only with respect to the YZ plane, that is, a rotationally asymmetric surface.

Next, the optical action in the embodiment is described. Light flux from the two-dimensional object passes through the image-taking optical system including the reflecting surfaces R1 and R3 to R7 and a low pass filter LPF to form an image on an image pickup device ID.

Figure 11:
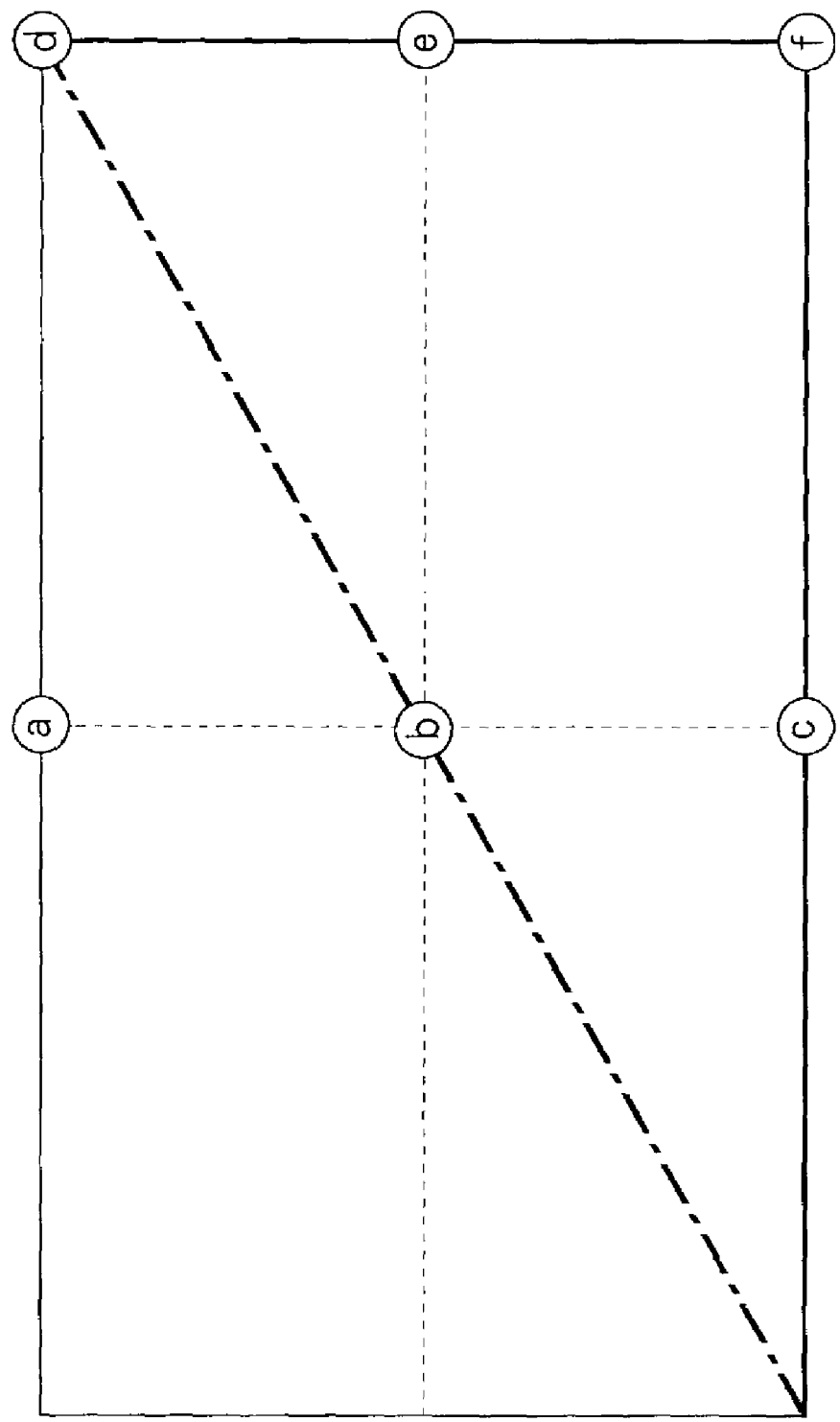
FIG. 11 shows positions at which defocus characteristics are evaluated in the image-taking optical system shown in FIG. 9.
Figure 12:
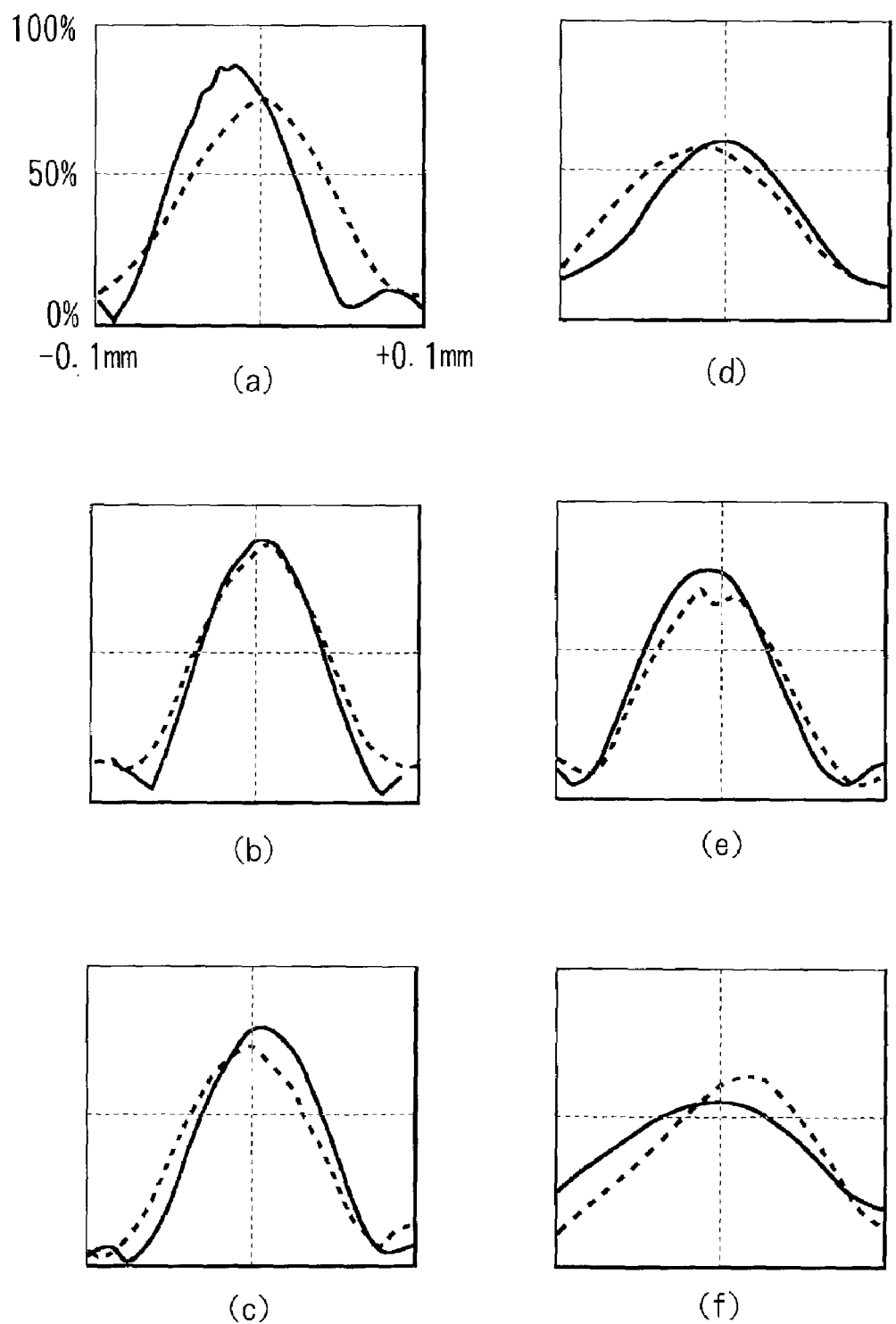
FIG. 12 shows defocus characteristics of the image-taking optical system (in a first state) shown in FIG. 9.

FIG. 12 are graphs showing defocus characteristics of the image-taking optical system in state 1, while FIG. 13 are graphs showing defocus characteristics in state 2. Evaluation points in an image surface are (a) to (f) in FIG. 11 at which the MTF is shown for a spatial frequency of 50 l/mm in a range of −0.1 mm to +0.1 mm from the image pickup device ID. Solid lines in the graphs represent contrast values in the y direction in the local coordinate on the image pickup device ID, while broken lines represent contrast values in the x direction.

It is seen from the graphs that the MTF peak values at the respective evaluation points are at the position of the image pickup device in both states. In other words, focus is achieved on the image pickup device ID in both states.

Figure 14:
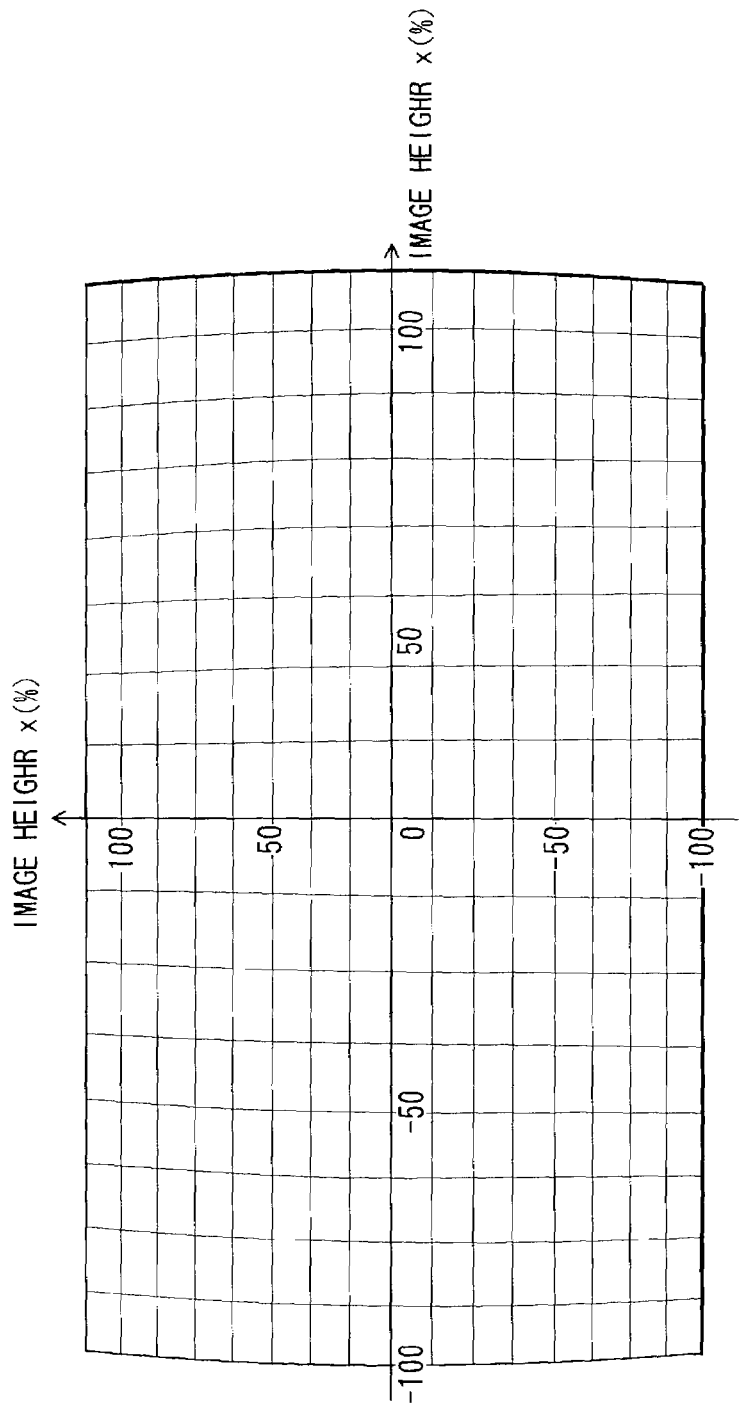
FIG. 14 shows distortion of the image-taking optical system (in the first state) shown in FIG. 9.
Figure 15:
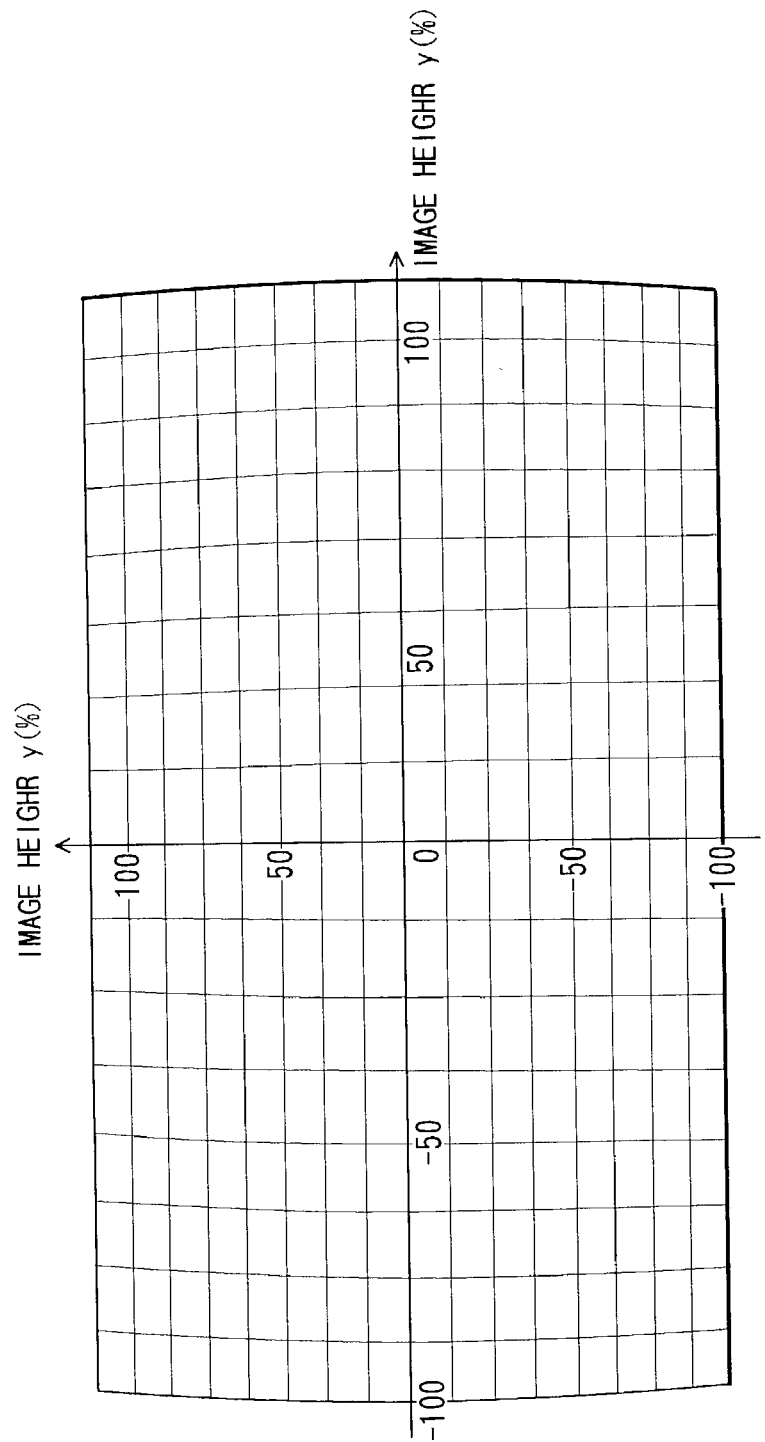
FIG. 15 shows distortion of the image-taking optical system (in the second state) shown in FIG. 9.

FIG. 14 shows distortion of a formed image on the image pickup device ID in state 1, while FIG. 15 shows distortion of a formed image on the image pickup device ID in state 2. As apparent from these figures, the formed images do not include large distortion, and include little asymmetric distortion in both states.

In the image-taking optical system used in the embodiment, focal lengths f(0), f(90) at azimuths of 0 and 90 degrees around the reference axis, distances ss(0), ss(90) from the front principal point to the object surface, and magnifications β(0), β(90) at the azimuths of 0 and 90 degrees are represented by:

$$f(0)=-3.669, f(90)=-2.994$$

$$ss(0)=217.949, ss(90)=220.941$$

$$\beta y'=\beta(0)'=f(0)/(f(0)+ss(0))=-0.01712$$

$$\beta x'=\beta(90)'=f(90)/(f(90)+ss(90))=-0.01373$$

Thus, the following expression holds:

$$|1-(\beta(0)'\cdot\cos(40°))/\beta(90)'|=0.04530 \quad (7)$$

The condition for maintaining the length-to-width ratio of the image of the two-dimensional object is that the value resulting from the aforementioned expression (7) is small. If the value from the expression (7) is larger than 0.2, distortion of the formed image is large and correction of aberration is difficult.

While the aperture stop R9 in the embodiment plays a role of adjusting the amount of light incident on the image-taking optical system, the aperture stop may be realized by an opening which does not have such a role. In this case, the necessary adjustment of a light amount is achieved by electrical correction or the like with the image pickup device.

While the surface R1 is the plane mirror in the embodiment, it may be implemented by a reflecting surface having curvature. In this case, a higher degree of flexibility in design can achieve a higher performance image-taking optical system.

Figure 16:
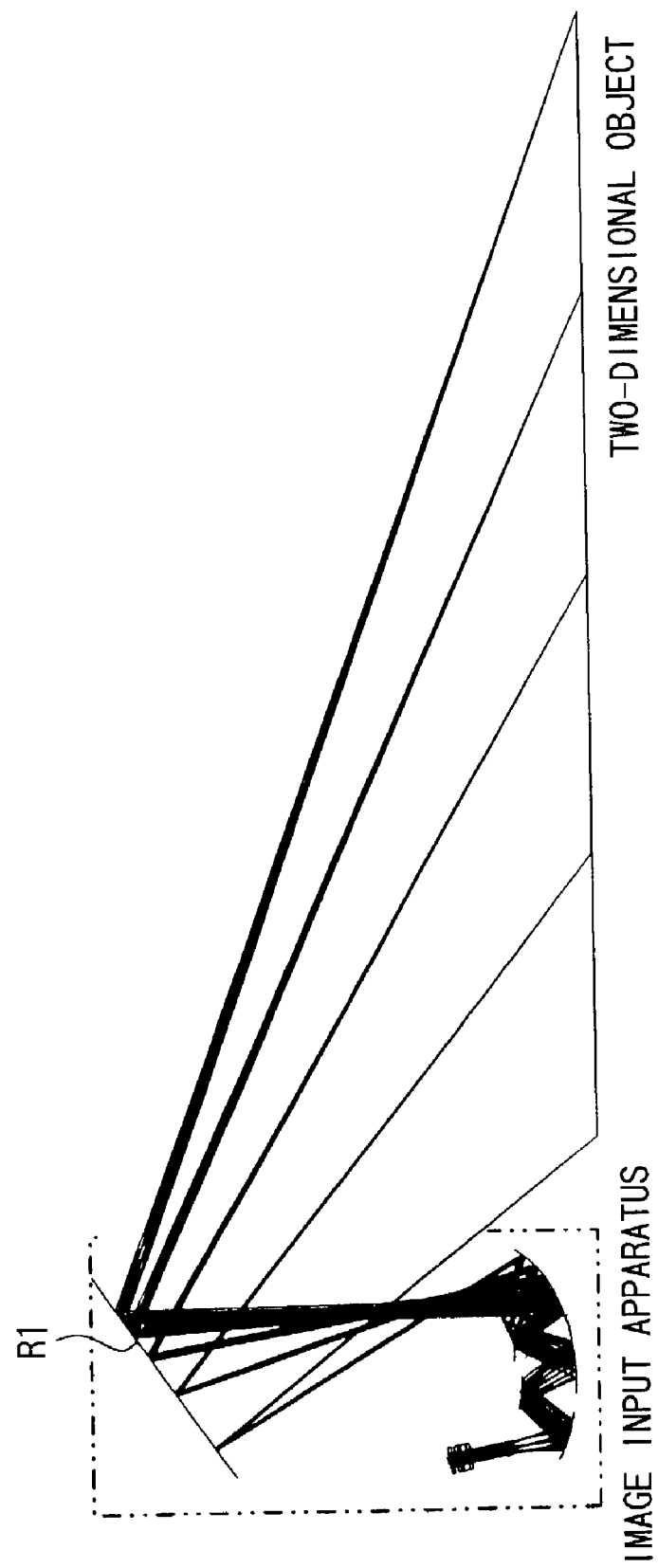
FIG. 16 shows an image input apparatus having the image-taking optical system shown in FIG. 5.

FIG. 16 shows an image input apparatus comprising the image-taking optical system described in the embodiment shown in FIGS. 5 and 6.

Such an image-taking optical system which takes images of a two-dimensional object from an oblique direction is used to allow the image-taking optical system to be displaced from above the two-dimensional object. It is thus possible to realize a compact apparatus which does not require a post for supporting the image-taking optical system above the two-dimensional object or a stage for stabilizing the apparatus.

Figure 17:
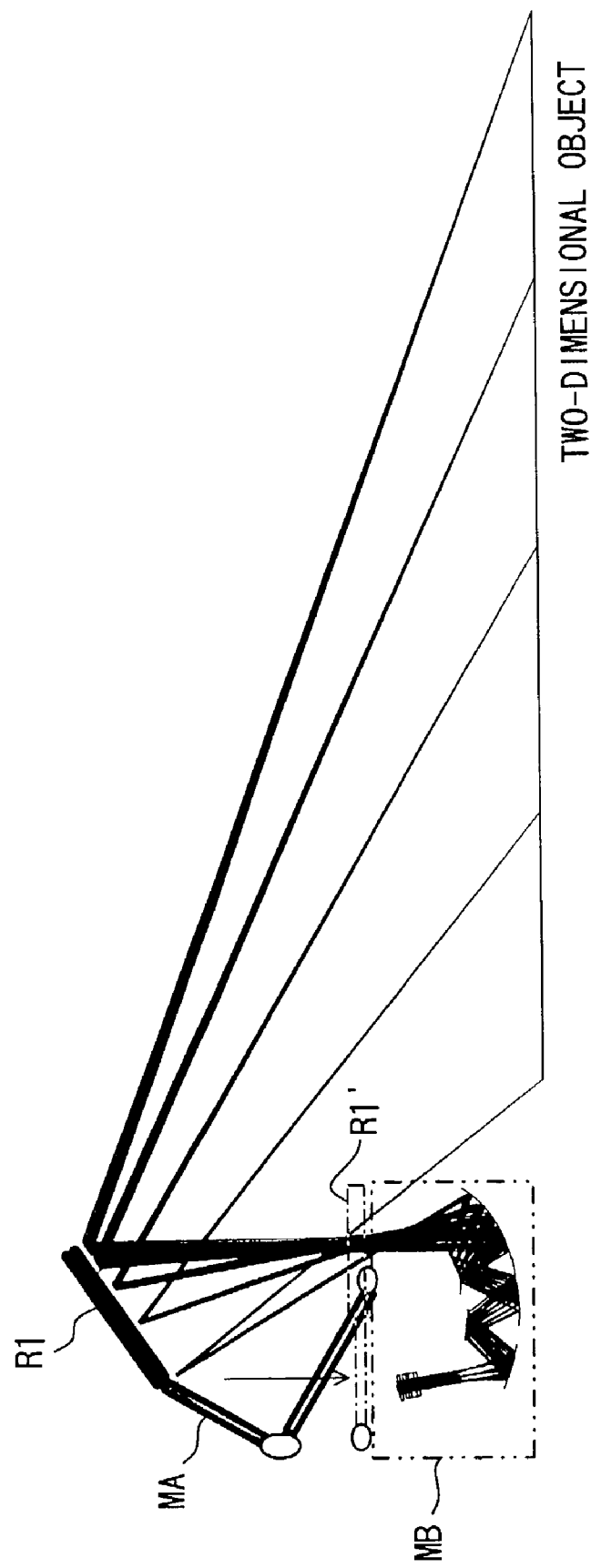
FIG. 17 shows an image input apparatus having the image-taking optical system shown in FIG. 5.
Figure 18:
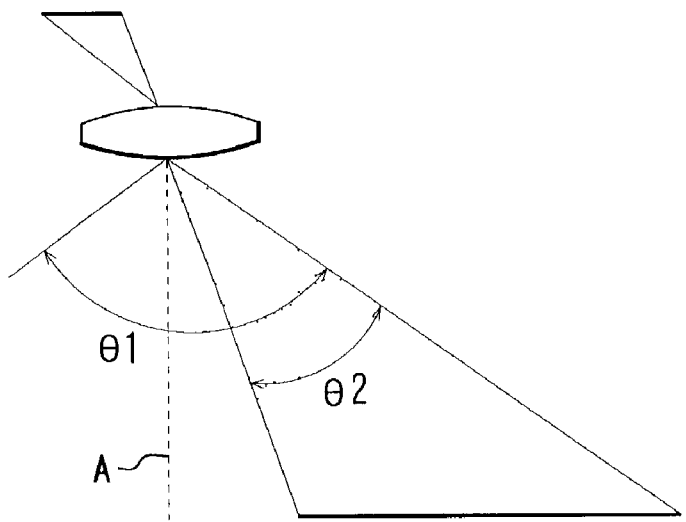
FIG. 18 is a conceptual view of a conventional shift optical system.
Figure 19:
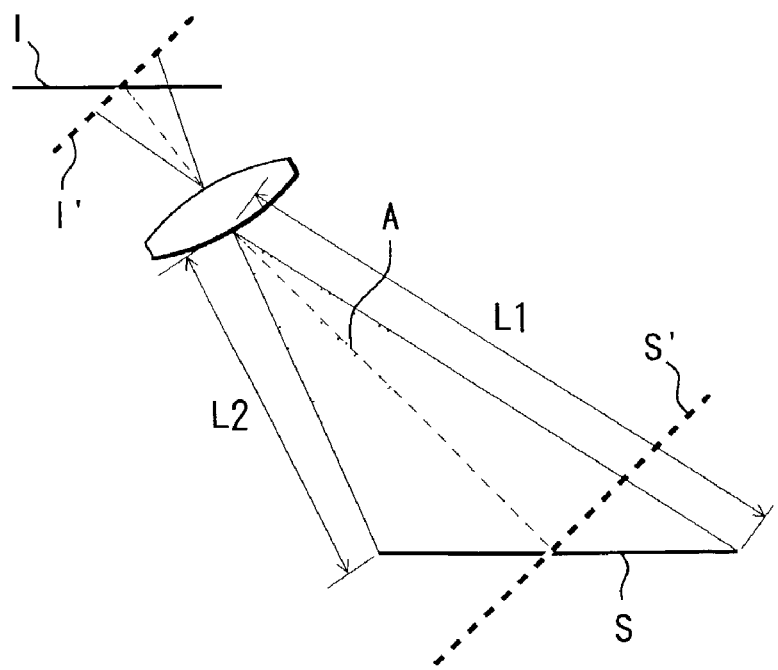
FIG. 19 is a conceptual view of an optical system for oblique image-taking.

FIG. 17 shows an image input apparatus comprising the image-taking optical system described in the embodiment shown in FIGS. 5 and 6.

A reflecting surface R1 by which light flux from a two-dimensional object is first reflected is held by a movable arm MA. When the image input apparatus is used, the reflecting surface R1 is placed at a predetermined position for taking images of the two-dimensional object from an oblique direction, and when the image input apparatus is not used, the movable arm MA folds to an apparatus body MB which houses the image-taking optical system subsequent to the aforementioned reflecting surface R1, an image pickup device ID and the like, so that the reflecting surface R1 is retracted with respect to the image-taking optical system subsequent to the reflecting surface R1 at the position shown by R1'.

While the embodiment has been described for the movable arm which can be used to retract the reflecting surface R1, the retraction method is not limited thereto.

As described above, according to the embodiment, since a plurality of reflecting surfaces are used to bend a path of light from the two-dimensional object such as a paper document, the image-taking optical system (or its center of gravity), which has conventionally been placed above the object, can be displaced from above the object. This configuration can eliminate the need for a post for holding the image-taking optical system above the object, a stage for stabilizing the whole apparatus and the like to make the image input apparatus compact.

Especially, when a curved reflecting surface is used for at least some of the reflecting surfaces and an appropriate value is set for the magnification around the reference axis (for example, when the aforementioned condition in the expression (1) is satisfied), trapezoidal distortion can be suppressed in an image formed on the image-taking surface even when the image-taking optical system is of an oblique image-taking type.

In addition, when an off axial optical system having a rotationally asymmetric surface as a curved reflecting surface is used, it is easy to provide asymmetric characteristics for the optical axis. It is thus possible to more effectively correct trapezoidal distortion in a formed image.

In the image input apparatus comprising such an image-taking optical system, the first reflecting surface by which light flux from the two-dimensional object is first reflected out of the plurality of reflecting surfaces can be moved to a position at which the first reflecting surface guides the light flux from the two-dimensional object to the image-taking optical system subsequent to the first reflecting surface and to a position at which the first reflecting surface is retracted to the image-taking optical system subsequent to the first reflecting surface, thereby making the image input apparatus compact when it is not used.

While preferred embodiments have been described, it is to be understood that modification and variation of the present invention may be made without departing from the sprit or scope of the following claims.

What is claimed is:

1. An image-taking optical system for forming an image of a two-dimensional object on an image-taking surface, comprising:
    a plurality of reflecting surfaces which reflect light from said two-dimensional object sequentially and guide the light to said image-taking surface,
    wherein a reference axis passing through the center of the pupil of said image-taking optical system and the center of the image formed on said image-taking surface is inclined with respect to the normal line of said two-dimensional object.

2. The image-taking optical system according to claim 1, wherein said reflecting surfaces include at least one curved reflecting surface.

3. The image-taking optical system according to claim 2, wherein said curved reflecting surface is a rotationally asymmetric surface.

4. The image-taking optical system according to claim 2, wherein said reflecting surfaces include at least two of said curved reflecting surfaces, and the image-taking optical system further comprising an aperture stop which is disposed between said two curved reflecting surfaces.

5. The image-taking optical system according to claim 2, further comprising an aperture stop which is disposed on said curved reflecting surface.

6. The image-taking optical system according to claim 2, further comprising an aperture stop which is disposed between said curved reflecting surface and said image-taking surface.

7. The image-taking optical system according to claim 1, wherein the relative distance between optical surfaces of said image-taking optical system is variable for focusing.

8. The image-taking optical system according to claim 1, wherein the relative distance between an optical surface of said image-taking optical system and said image-taking surface is variable for focusing.

9. The image-taking optical system according to claim 1, wherein the following condition is satisfied:

$$|1-\cos\theta\cdot\beta(\alpha)/\beta(\alpha+90°)|<0.2$$

where $\theta$ is an angle of inclination of said reference axis with respect to said normal line of said two-dimensional object, $\alpha$ is an azimuth representing a plane including said reference axis and said normal line of said two-dimensional object, and $\beta(\xi)$ is a magnification of said image-taking optical system at an azimuth $\xi°$ around said reference axis.

10. The image-taking optical system according to claim 1, wherein each reflecting surface of said plurality of reflecting surfaces other than a reflecting surface by which light from said two-dimensional object is first reflected consists of a surface reflecting mirror.

11. The image-taking optical system according to claim 1, wherein each reflecting surface of said plurality of reflecting surfaces other than a reflecting surface by which light from said two-dimensional object is first reflected consists of an internal reflecting surface in an optical element in a prism shape having two refraction surfaces which the light enter and exit.

12. An image input apparatus comprising:

the image-taking optical system according to claim 1, and a photoelectric converting element which is disposed on said image-taking surface and photoelectrically converts the image of said two-dimensional object formed by said image-taking optical system.

13. The image input apparatus according to claim 12, wherein a first reflecting surface of said plurality of reflecting surfaces by which light from said two-dimensional object is first reflected can be moved to a position at which said first reflecting surface guides the light from said two-dimensional object to said image-taking optical system subsequent to said first reflecting surface and to a position at which said first reflecting surface is retracted with respect to said image-taking optical system subsequent to said first reflecting surface.

* * * * *